(12) United States Patent
Ito

(10) Patent No.: US 11,218,613 B1
(45) Date of Patent: Jan. 4, 2022

(54) MEDIUM CONVEYING APPARATUS FOR CONTROLLING MEDIUM CONVEYANCE BASED ON INCLINATION OF MEDIUM AND POSITION OF MEDIUM

(71) Applicant: PFU LIMITED, Kahoku (JP)

(72) Inventor: Takumi Ito, Kahoku (JP)

(73) Assignee: PFU LIMITED, Kahoku (JP)

( * ) Notice: Subject to any disclaimer, the term of this patent is extended or adjusted under 35 U.S.C. 154(b) by 0 days.

(21) Appl. No.: 16/926,308

(22) Filed: Jul. 10, 2020

(30) Foreign Application Priority Data

Jun. 18, 2020 (JP) .............................. JP2020-105551

(51) Int. Cl.
*H04N 1/60* (2006.01)
*H04N 1/00* (2006.01)

(52) U.S. Cl.
CPC ..... *H04N 1/00721* (2013.01); *H04N 1/00588* (2013.01); *H04N 1/00734* (2013.01); *H04N 1/6027* (2013.01)

(58) Field of Classification Search
CPC ........... H04N 1/00721; H04N 1/00588; H04N 1/00748; H04N 1/407; H04N 1/6027; H04N 2201/0081; H04N 2201/0094; H04N 7/0125; H04N 7/0142; H04N 9/68; H04N 1/0057; H04N 1/0071; H04N 1/00718; H04N 1/00724; H04N 1/00734; H04N 1/00779; H04N 1/047; H04N 1/3878; H04N 2201/0471; H04N 2201/04737; H04N 2201/04787; H04N 2201/3254; H04N 5/23206; H04N 5/23222; H04N 5/23241; H04N 5/23245; H04N 5/23293; H04N 7/18; G09G 2340/0407; G09G 2320/0233; G09G 2320/0646; G09G 2360/16; G09G 3/3426; G09G 2310/0232; G09G 2320/0238; G09G 2320/0276; G09G 2330/021; G09G 2340/0442; G09G 2340/0485; G09G 2340/06; G09G 3/3406;

(Continued)

(56) References Cited

U.S. PATENT DOCUMENTS 7,850,273 B2 * 12/2010 Yasutani .............. B41J 2/04558
                                                                347/16
7,959,151 B2 *  6/2011 Fukube .................... B65H 7/14
                                                             271/258.01

(Continued)

FOREIGN PATENT DOCUMENTS

| JP | 2012-206858 A | 10/2012 |
|---|---|---|
| JP | 2019-116383 A | 7/2019 |
| JP | 2013-193837 A | 9/2019 |

Primary Examiner — Negussie Worku
(74) *Attorney, Agent, or Firm* — Lewis Roca Rothgerber Christie LLP

(57) ABSTRACT

A medium conveying apparatus includes a conveyance roller to convey a medium, an imaging sensor to sequentially generate a line image acquired by imaging the medium conveyed by the conveyance roller, a processor to detect an inclination of the conveyed medium based on at least two first pixels in the line image, determine whether a part of the conveyed medium has passed through a position corresponding to a second pixel located outside the first pixels based on the line image, and stop conveyance of the medium by the conveyance roller when the detected inclination is equal to or greater than a threshold value and the processor determines that a part of the medium has passed through the position corresponding to the second pixel.

16 Claims, 15 Drawing Sheets

(58) Field of Classification Search
CPC .............. G09G 3/3611; G09G 3/3648; G03G 15/1615; G03G 15/5029; G03G 15/5054; G03G 15/55; G03G 2215/0016; G06T 2207/20208; G06T 3/40; G06T 5/009; G06T 5/40; G06T 2207/10016; G06T 5/008; G06T 7/586; B65B 35/14; B65B 35/26; B65B 57/00; G06K 2009/0059; G06K 7/10722; G06K 9/00577; G06K 9/4642
USPC ......................................................... 358/504
See application file for complete search history.

(56) References Cited

U.S. PATENT DOCUMENTS

| | | | |
|---|---|---|---|
| 8,419,155 B2* | 4/2013 | Kawakami | ............... B41J 11/42 347/16 |
| 8,474,814 B2* | 7/2013 | Noda | ..................... B65H 9/006 271/227 |
| 8,593,683 B2* | 11/2013 | Ikari | ..................... H04N 1/3878 358/1.9 |
| 9,823,158 B2* | 11/2017 | Komninos | ............... G01M 3/24 |
| 10,129,415 B2* | 11/2018 | Morikawa | .......... H04N 1/00602 |
| 2013/0231145 A1* | 9/2013 | Pascal | ................. G06F 12/0842 455/466 |
| 2013/0241145 A1 | 9/2013 | Yasukawa | |
| 2017/0155796 A1* | 6/2017 | Watanabe | .......... H04N 1/00748 |
| 2017/0353611 A1* | 12/2017 | Koyama | ............... H04N 1/4092 |
| 2019/0193967 A1* | 6/2019 | Shuto | ................. H04N 1/00628 |
| 2020/0101736 A1* | 4/2020 | Satoh | ................... B41J 2/16508 |
| 2020/0177751 A1* | 6/2020 | Shiota | .................... B65H 3/063 |
| 2020/0252513 A1* | 8/2020 | Nakada | ............. H04N 1/00779 |
| 2021/0084181 A1* | 3/2021 | Sakai | ................. H04N 1/00737 |
| 2021/0084182 A1* | 3/2021 | Sakai | ................. H04N 1/00748 |

* cited by examiner

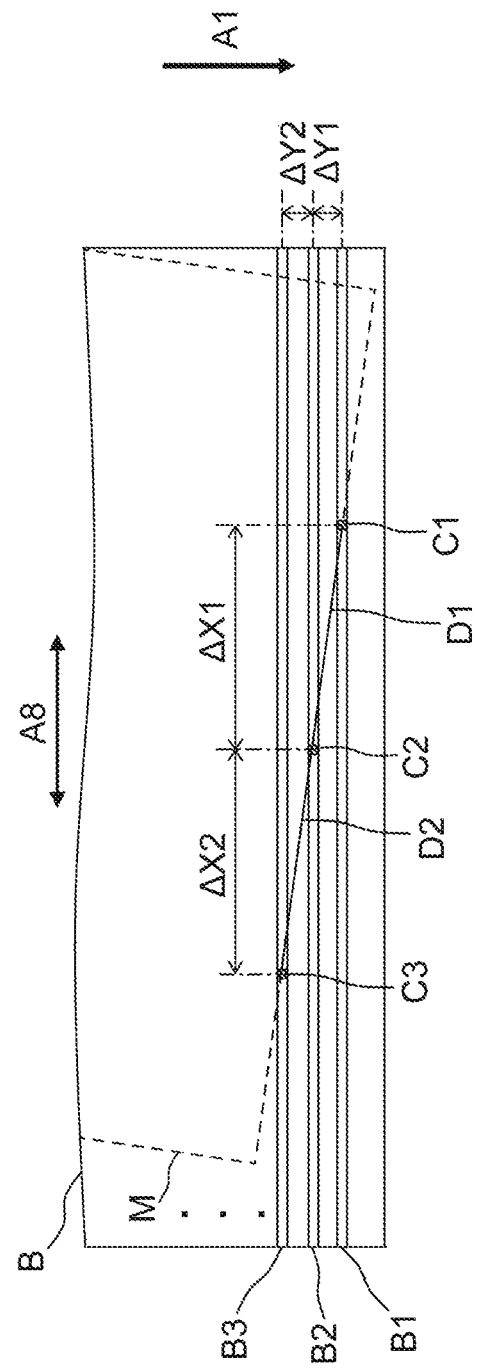

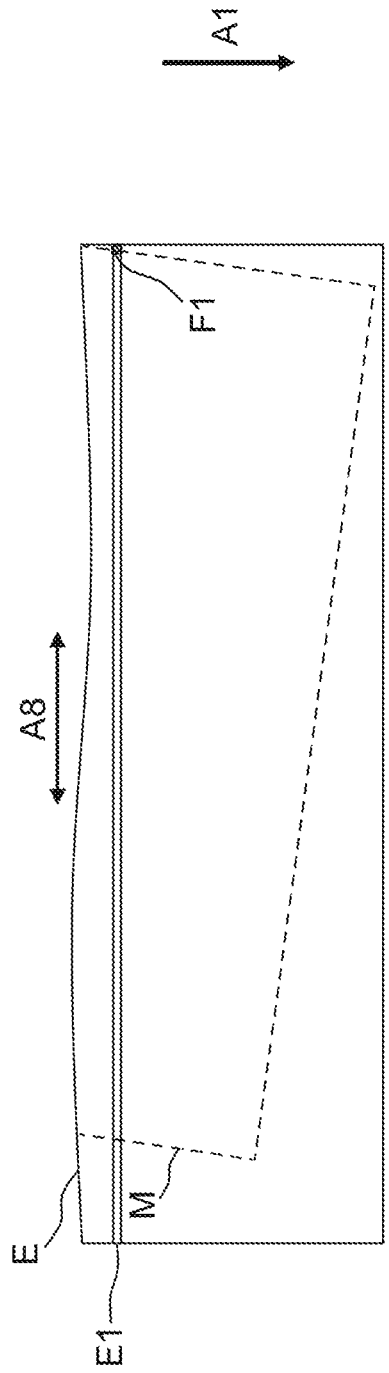

MEDIUM CONVEYING APPARATUS FOR CONTROLLING MEDIUM CONVEYANCE BASED ON INCLINATION OF MEDIUM AND POSITION OF MEDIUM

CROSS-REFERENCE TO RELATED APPLICATIONS

This application is based upon and claims the benefit of priority of prior Japanese Patent Application No. 2020-105551, filed on Jun. 18, 2020, the entire contents of which are incorporated herein by reference.

TECHNICAL FIELD

Embodiments discussed in the present specification relate to medium conveyance.

BACKGROUND

In a medium conveying apparatus such as a scanner, a conveyance abnormality such as a skew (oblique motion) or a jam (paper jam) may occur when a medium moves in a conveyance path. In the medium conveying apparatus, it is necessary to appropriately stop the conveyance of the medium in order to prevent from occurring damage of the medium when the conveyance abnormality of the medium occurs.

An image processing apparatus that predicts a first predicted position at which a front end of a sheet protrudes by a predetermined amount in a direction perpendicular to a sheet conveying direction based on a position of the front end of the sheet and a skew amount of the sheet, and stops a conveying mechanism before the first predicted position, is disclosed (Japanese Unexamined Patent Publication (Kokai) No. 2012-206858).

SUMMARY

According to some embodiments, a medium conveying apparatus includes a conveyance roller to convey a medium, an imaging sensor to sequentially generate a line image acquired by imaging the medium conveyed by the conveyance roller, a processor to detect an inclination of the conveyed medium based on at least two first pixels in the line image, determine whether a part of the conveyed medium has passed through a position corresponding to a second pixel located outside the first pixels based on the line image, and stop conveyance of the medium by the conveyance roller when the detected inclination is equal to or greater than a threshold value and the processor determines that a part of the medium has passed through the position corresponding to the second pixel.

According to some embodiments, a method for controlling conveying a medium includes conveying a medium by a conveyance roller, sequentially generating a line image acquired by imaging the medium conveyed by the conveyance roller, by an imaging sensor, detecting an inclination of the conveyed medium based on at least two first pixels in the line image, determining whether a part of the conveyed medium has passed through a position corresponding to a second pixel located outside the first pixels based on the line image, and stopping conveyance of the medium by the conveyance roller when the detected inclination is equal to or greater than a threshold value and the processor determines that a part of the medium has passed through the position corresponding to the second pixel.

According to some embodiments, a computer-readable, non-transitory medium stores a computer program. The computer program causes a medium conveying apparatus including a conveyance roller to convey a medium, and an imaging sensor to sequentially generate a line image acquired by imaging the medium conveyed by the conveyance roller, to execute a process including detecting an inclination of the conveyed medium based on at least two first pixels in the line image, determining whether a part of the conveyed medium has passed through a position corresponding to a second pixel located outside the first pixels based on the line image, and stopping conveyance of the medium by the conveyance roller when the detected inclination is equal to or greater than a threshold value and the processor determines that a part of the medium has passed through the position corresponding to the second pixel.

BRIEF DESCRIPTION OF DRAWINGS

FIG. 9A is a schematic diagram for illustrating an inclination of a medium.

FIG. 9B is a schematic diagram for illustrating a passage of a position corresponding to the second pixel of the medium.

DESCRIPTION OF EMBODIMENTS

It is to be understood that both the foregoing general description and the following detailed description are exemplary and explanatory, and are not restrictive of the invention, as claimed.

Hereinafter, a medium conveying apparatus, a method and a computer-readable, non-transitory medium storing a computer program according to an embodiment, will be described with reference to the drawings. However, it should be noted that the technical scope of the invention is not limited to these embodiments, and extends to the inventions described in the claims and their equivalents.

Figure 1:
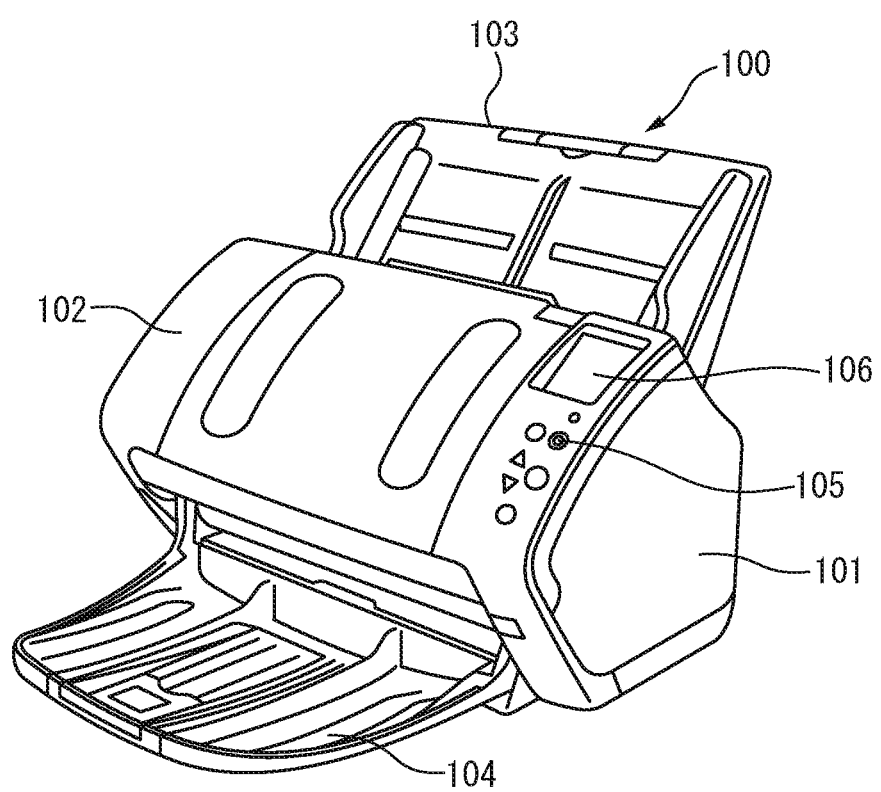
FIG. 1 is a perspective view illustrating a medium conveying apparatus 100 according to an embodiment.

FIG. 1 is a perspective view illustrating a medium conveying apparatus 100 configured as an image scanner. The medium conveying apparatus 100 conveys and images a medium being a document. A medium is paper, thick paper, a card, a brochure, a passport, etc. The medium conveying apparatus 100 may be a fax machine, a copying machine, a multifunctional peripheral (MFP), etc. A conveyed medium may not be a document but may be an object being printed on etc., and the medium conveying apparatus 100 may be a printer etc.

The medium conveying apparatus 100 includes a lower housing 101, an upper housing 102, a medium tray 103, an ejection tray 104, an operation device 105, and a display device 106.

The upper housing 102 is located at a position covering the upper surface of the medium conveying apparatus 100 and is engaged with the lower housing 101 by hinges so as to be opened and closed at a time of medium jam, during cleaning the inside of the medium conveying apparatus 100, etc.

The medium tray 103 is engaged with the lower housing 101 in such away as to be able to place a medium to be conveyed. The ejection tray 104 is engaged with the lower housing 101 in such a way as to be able to hold an ejected medium.

The operation device 105 includes an input device such as a button, and an interface circuit acquiring a signal from the input device, receives an input operation by a user, and outputs an operation signal based on the input operation by the user. The display device 106 includes a display including a liquid crystal or organic electro-luminescence (EL), and an interface circuit for outputting image data to the display, and displays the image data on the display.

Figure 2:
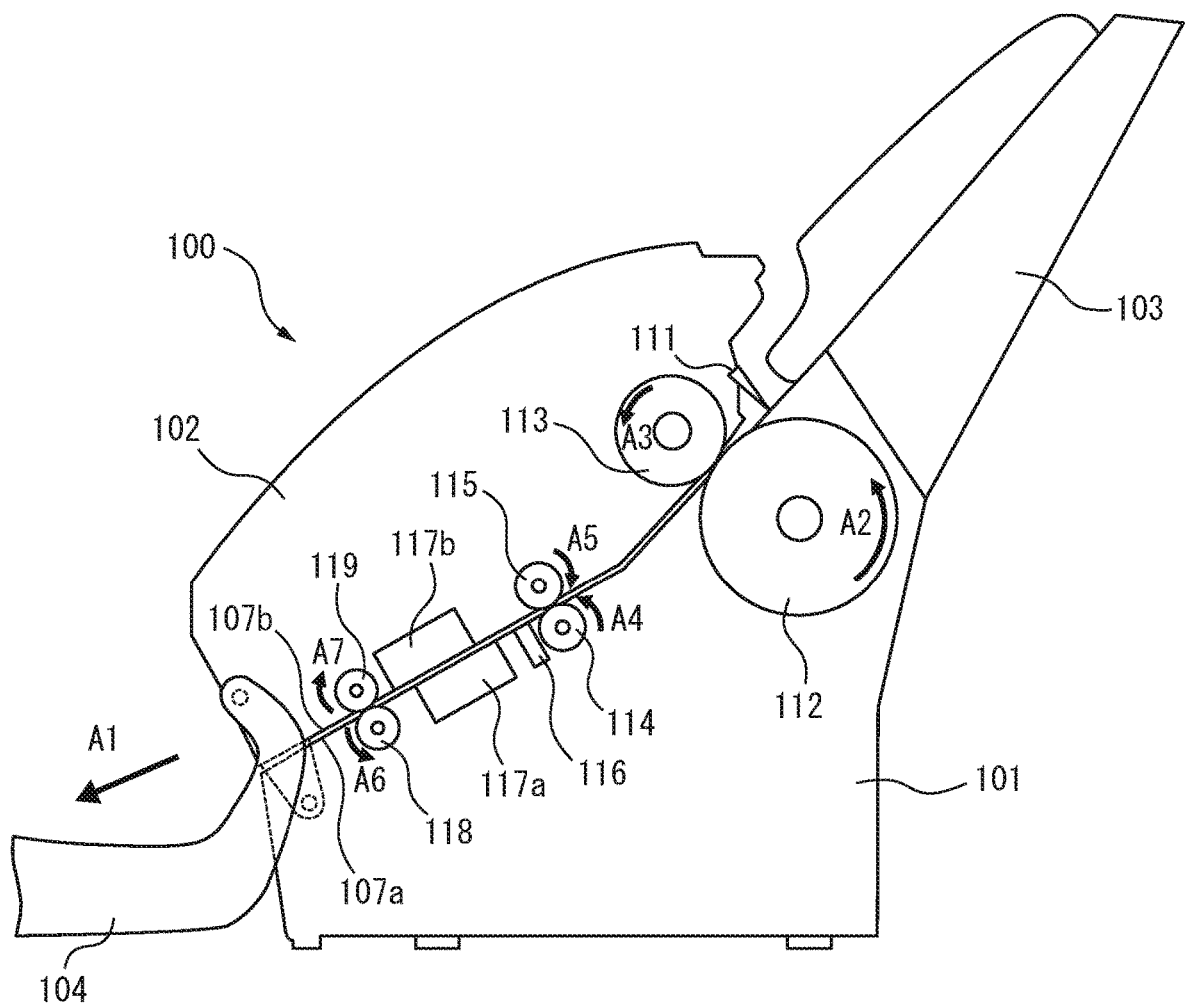
FIG. 2 is a diagram for illustrating a conveyance path inside the medium conveying apparatus 100.

FIG. 2 is a diagram for illustrating a conveyance path inside the medium conveying apparatus 100.

The conveyance path inside the medium conveying apparatus 100 includes a first sensor 111, a feed roller 112, a brake roller 113, a first conveyance roller 114, a second conveyance roller 115, a second sensor 116, a first imaging device 117a, a second imaging device 117b, a third conveyance roller 118 and a fourth conveyance roller 119, etc. The numbers of each roller is not limited to one, and may be plural. The first imaging device 117a and the second imaging device 117b may be collectively referred to as imaging devices 117.

Atop surface of the lower housing 101 forms a lower guide 107a of a conveyance path of a medium, and a bottom surface of the upper housing 102 forms an upper guide 107b of the conveyance path of a medium. An arrow A1 in FIG. 2 indicates a medium conveying direction. An upstream hereinafter refers to an upstream in the medium conveying direction A1, and a downstream refers to a downstream in the medium conveying direction A1.

The first sensor 111 is located on the upstream side of the feed roller 112 and the brake roller 113. The first sensor 111 includes a contact detection sensor and detects whether or not a medium is placed on the medium tray 103. The first sensor 111 generates and outputs a first medium signal whose signal value changes between a state in which a medium is placed on the medium tray 103 and a state in which a medium is not placed.

The feed rollers 112 are provided on the lower housing 101 and sequentially feed media placed on the medium tray 103 from the lower side. The brake rollers 113 are provided on the upper housing 102 and each of the plurality of brake rollers 113 is located to face a corresponding one of the feed rollers 112.

The second sensor 116 is an example of a medium sensor, and is located between the first conveyance roller 114 and the second conveyance roller 115 in a medium conveyance direction A1 and the imaging device 117 at a substantially central position in a width direction A8 perpendicular to the medium conveyance direction A1. The second sensor 116 includes a light emitter and a light receiver provided on one side (e.g., the lower housing 101) with respect to a medium conveyance path, and a reflecting member such as a mirror provided at a position (e.g., the upper housing 102) facing the light emitter and the light receiver across the medium conveyance path. The light emitter emits light toward the conveyance path. On the other hand, the light receiver receives light emitted by the light emitter and reflected by the reflection member, and generates and outputs a second medium signal being an electric signal based on intensity of the received light. The light emitted by the light emitter is shielded by the medium when the medium is present at the position of the second sensor 116. Therefore, the signal value of the second medium signal is changed in a state where the medium is present at the position of the second sensor 116 and a state where the medium is not present. Consequently, the second sensor 116 detects whether or not a medium exists at the position and detects a fed medium. The light emitter and the light receiver may be provided at positions facing one another with the conveyance path in between, and the reflection member may be omitted.

A medium placed on the medium tray 103 is conveyed between the lower guide 107a and the upper guide 107b in the medium conveying direction A1 by the feed rollers 112 rotating in a direction of an arrow A2 in FIG. 2, that is, a medium feeding direction. When a medium is conveyed, the brake rollers 113 rotate in a direction of an arrow A3, that is, a direction opposite to the medium feeding direction. By the workings of the feed rollers 112 and the brake rollers 113, when a plurality of media are placed on the medium tray 103, only a medium in contact with the feed rollers 112, out of the media placed on the medium tray 103, is separated. Consequently, the medium conveying apparatus 100 operates in such a way that conveyance of a medium other than the separated medium is restricted (prevention of multifeed).

The medium is fed between the first conveyance roller 114 and the second conveyance roller 115 while being guided by the lower guide 107a and the upper guide 107b. The medium is fed between the first imaging device 114a and the second imaging device 114b by the first conveyance roller 114 and the second conveyance roller 115 rotating in directions of an arrow A4 and an arrow A5, respectively. The feed roller 112, the brake roller 113, the first conveyance roller 114, and the secondary conveyance roller 115 are examples of a conveyance roller to convey a medium. The medium read by the imaging device 117 is ejected on the ejection tray 104 by rotating the third conveyance roller 118 and the fourth conveyance roller 119 in the directions of arrows A6 and A7, respectively.

Figure 3:
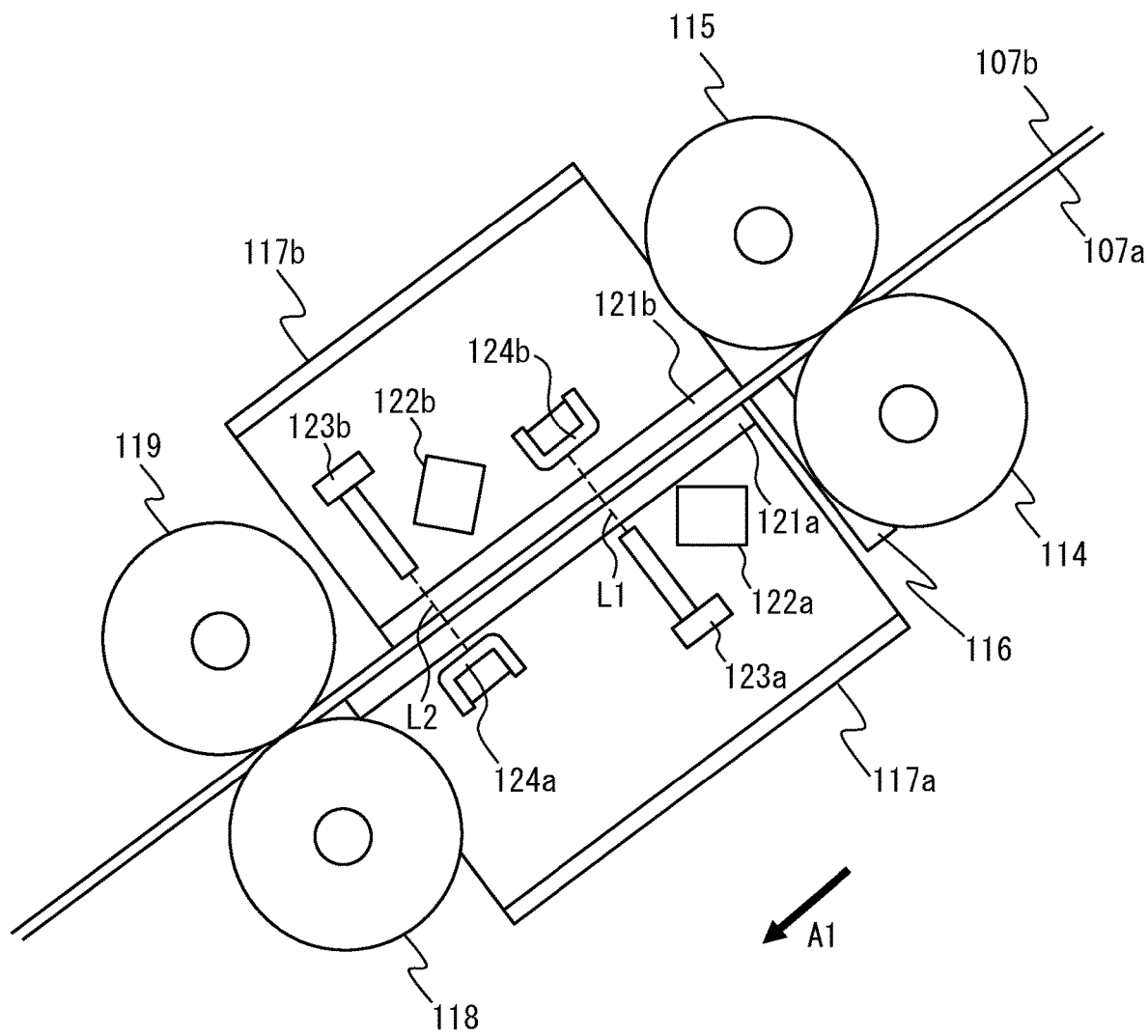
FIG. 3 is a schematic diagram for illustrating an imaging device 117.

FIG. 3 is a diagram for illustrating the imaging device 117.

As shown in FIG. 3, the first imaging device 117a and the second imaging device 117b are located to face each other. The first imaging device 117a includes a first light transmitting member 121a, a first light source 122a, a first imaging sensor 123a, a first backing member 124a, etc. The second imaging device 117b includes a second light transmitting member 121b, a second light source 122b, a second imaging sensor 123b and a second backing member 124b, etc.

The first light transmitting member 121a and the second light transmitting member 121b are formed of transparent glass. The first light transmitting member 121a and the second light transmitting member 121b may be formed of transparent plastic, etc.

The first light source 122a is provided on the opposite side of the second backing member 124b with the first light transmitting member 121a and the second light transmitting member 121b in between. The first light source 122a includes LED (Light Emitting Diode) and emits light toward the front surface of the medium conveyed to a position of the imaging device 117 (toward the second backing member 124b facing the first light source 122a when a medium is not conveyed).

Similarly, the second light source 122b is provided on the opposite side of the first backing member 124a with the second light transmitting member 121b and the first light transmitting member 121a in between. The second light source 122b has an LED, and emits light toward the back surface of the medium conveyed to the position of the imaging device 117 (toward the first backing member 124a facing the second light source 122b when a medium is not conveyed).

The first imaging sensor 123a is an example of a first imaging module, and is provided on the opposite side of the second backing member 124b with the first light transmitting member 121a and the second light transmitting member 121b in between. The first imaging sensor 123a includes a line sensor based on a unity-magnification optical system type contact image sensor (CIS) including an imaging element based on a complementary metal oxide semiconductor (CMOS) linearly located in a main scanning direction. Further, the first imaging sensor 123a includes a lens for forming an image on the imaging element, and an A/D converter for amplifying and analog-digital (A/D) converting an electric signal output from the imaging element. The first imaging sensor 123a images one surface (front surface) of the medium conveyed by the conveyance roller and the periphery of the medium at an imaging position L1. The first imaging sensor 123a sequentially generates and outputs a first line image acquired by imaging an area of the conveyed medium facing the line sensor, at certain intervals. When a medium is not conveyed, the first imaging sensor 123a generates and outputs a first reference image acquired by imaging the second backing member 124b. A pixel count of the first line image and the first reference image in a vertical direction (subscanning direction) is 1, and a pixel count in a horizontal direction (main scanning direction) is larger than 1.

Similarly, the second imaging sensor 123b is an example of a second imaging module, and is provided on the opposite side of the first backing member 124a with the first light transmitting member 121a and the second light transmitting member 121b in between. The second imaging sensor 123b is located on the downstream side of the first imaging sensor 123a in the medium conveying direction A1. The second imaging sensor 123b includes a line sensor based on a unity-magnification optical system type CIS including an imaging element based on a CMOS linearly located in a main scanning direction. Further, the second imaging sensor 123b includes a lens for forming an image on the imaging element, and an A/D converter for amplifying and A/D converting an electric signal output from the imaging element. The second imaging sensor 123b images one surface (back surface) of the medium conveyed by the conveyance roller and the periphery of the medium at an imaging position L2. The second imaging sensor 123b sequentially generates and outputs a second line image acquired by imaging an area of a conveyed medium facing the line sensor, at certain intervals. When a medium is not conveyed, the second imaging sensor 123b generates and outputs a second reference image acquired by imaging the first backing member 124a. A pixel count of the second line image and the second reference image in a vertical direction (subscanning direction) is 1, and a pixel count in a horizontal direction (main scanning direction) is larger than 1.

The first imaging sensor 123a and the second imaging sensor 123b are examples of an imaging module, and any one of the first imaging sensor 123a and the second imaging sensor 123b may be omitted. Further, a line sensor based on a unity-magnification optical system type CIS including an imaging element based on charge coupled devices (CCDs) may be used in place of the line sensor based on a unity-magnification optical system type CIS including an imaging element based on a CMOS. Further, a line sensor based on a reduction optical system type line sensor including an imaging element based on CMOS or CCDs.

The first backing member 124a is provided below the first light transmitting member 121a and at a position facing the second light source 122b and the second imaging sensor 123b. The first backing member 124a has a first facing surface facing the second imaging sensor 123b. The first facing surface has, for example, white, and functions as a white reference member for correcting an image such as shading based on an image signal in which the first facing surface is imaged.

Similarly, the second backing member 124b is provided above the second light transmitting member 121b and at a position facing the first light source 122a and the first imaging sensor 123a. The second backing member 124b has a second facing surface facing the first imaging sensor 123a. The second facing surface has, for example, white, and functions as a white reference member for correcting an image such as shading based on an image signal in which the second facing surface is imaged.

The first light source 122a and the second light source 122b may be collectively referred to as light sources 122. The first imaging sensor 123a and the second imaging sensor 123b may be collectively referred to as imaging sensors 123. The first backing member 124a and the second backing member 124b may be collectively referred to as backing members 124. The first facing surface and the second facing surface may be collectively referred to as facing surfaces.

Figure 4:
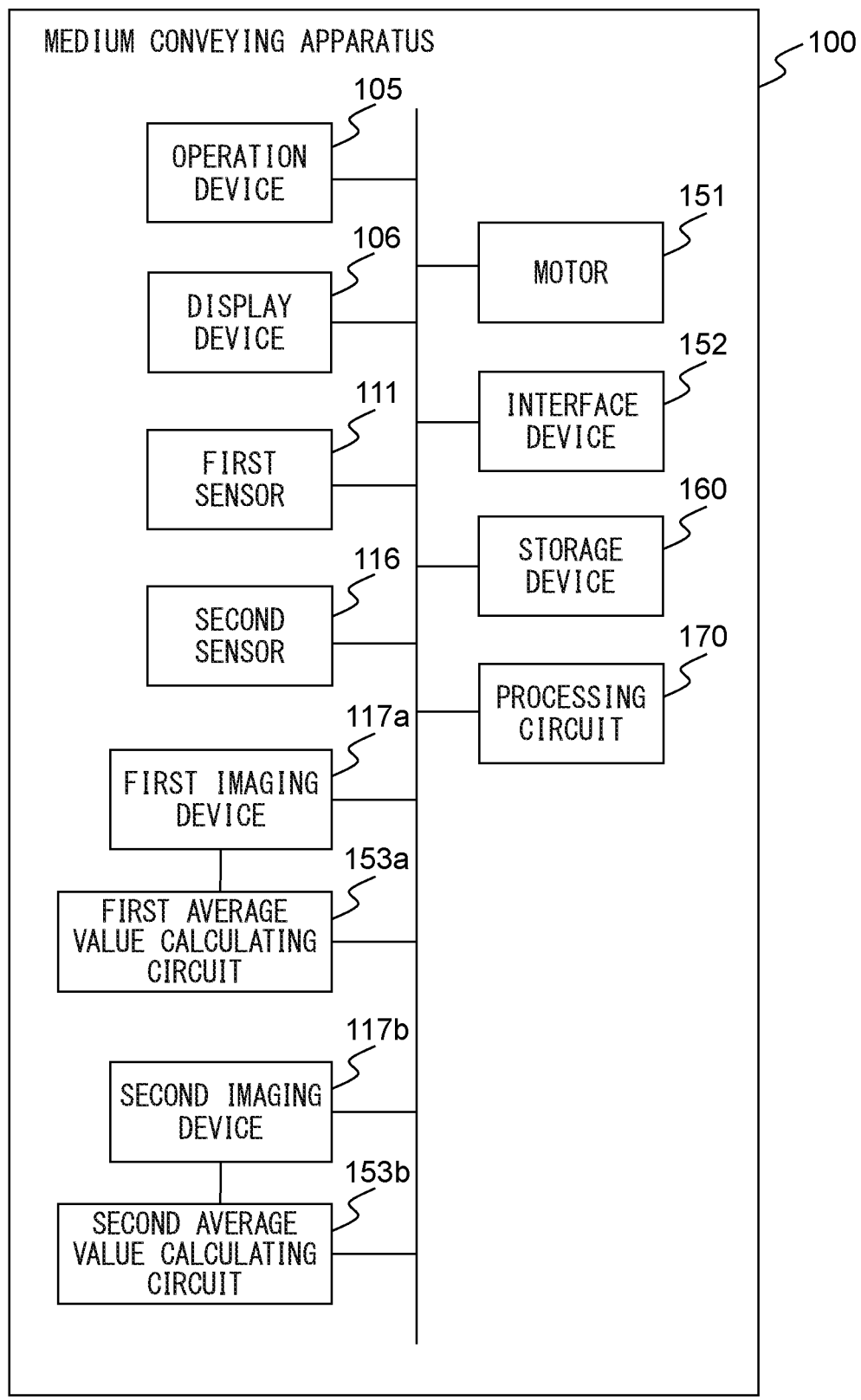
FIG. 4 is a block diagram illustrating a schematic configuration of the medium conveying apparatus 100.

FIG. 4 is a block diagram illustrating a schematic configuration of the medium conveying apparatus 100.

The medium conveying apparatus 100 further includes a motor 151, an interface device 152, a first average value calculating circuit 153a, a second average value calculating circuit 153b, a storage device 160, a processing circuit 170, etc., in addition to the configuration described above.

The motor 151 includes one or more motors, and rotates the feed roller 112, the brake roller 113, and the first to fourth conveyance rollers 114, 115, 118 and 119 to convey the medium in accordance with control signals from the processing circuit 170.

For example, the interface device 152 includes an interface circuit conforming to a serial bus such as universal serial bus (USB), is electrically connected to an unillustrated information processing apparatus (for example, a personal computer or a mobile information terminal), and transmits and receives an input image and various types of information. Further, a communication module including an antenna transmitting and receiving wireless signals, and a wireless communication interface device for transmitting and receiving signals through a wireless communication line in conformance with a predetermined communication protocol may be used in place of the interface device 152. For example, the predetermined communication protocol is a wireless local area network (LAN).

The first average value calculating circuit 153a receives the first line image from the first imaging device 117a each time the first imaging device 117a generates the first line image. The first average value calculating circuit 153a calculates a first average value of gradation values of peripheral pixels of each of first pixels in the received first line image, and outputs the first average value to the processing circuit 170. As the first pixel, a plurality of pixels are set by the processing circuit 170. The peripheral pixels are pixels located within a predetermined range (e.g., 5 pixels) from the first pixel. The gradation value is a luminance value or a color value (R value, G value or B value).

The second average value calculating circuit 153b receives the second line image from the second imaging device 117b each time the second imaging device 117b generates the second line image. The second average value calculating circuit 153b calculates a second average value of gradation values of peripheral pixels of a second pixel in the received second line image, and outputs the second average value to the processing circuit 170. As the second pixel, a pixel located outside the first pixel, that is, pixels located on the end side of the first pixel in the width direction A8 is set. As the second pixel, one or more pixels are set by the processing circuit 170. As the second pixel, for example, an end pixel located at an end in the width direction A8 in the second line image is set. The peripheral pixels are pixels located within a predetermined range (e.g., 5 pixels) from the second pixel.

The first average value calculating circuit 153a and the second average value calculating circuit 153b may be collectively referred to as average value calculating circuits 153. The average value calculating circuits 153 are DSP (digital signal processor), LSI (large scale integration), ASIC (Application Specific Integrated Circuit), FPGA (Field-Programmable Gate Array), etc.

Figure 5:
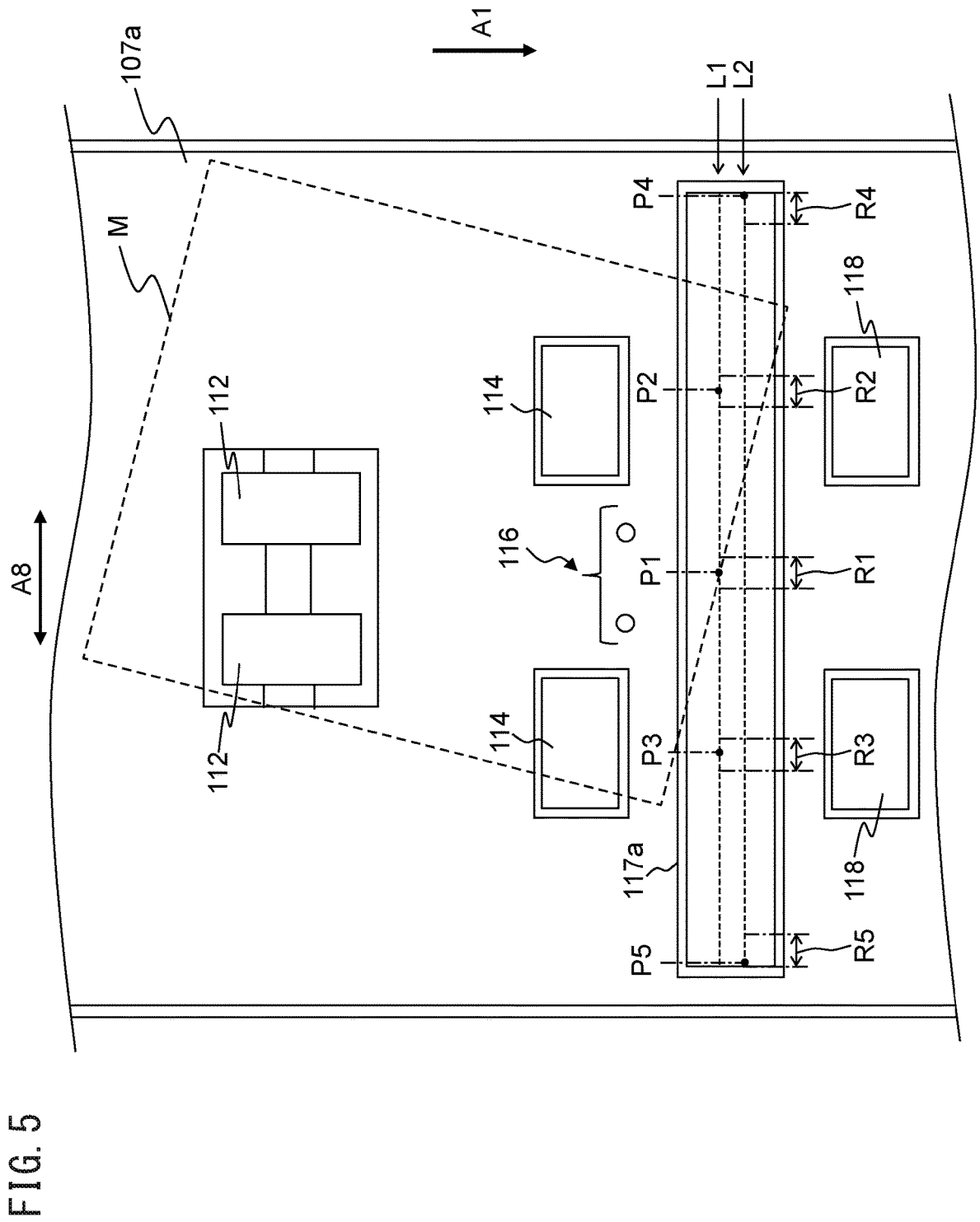
FIG. 5 is a schematic diagram for illustrating a first picture and a second picture.

FIG. 5 is a schematic diagram for illustrating the first pixel and the second pixel. FIG. 5 is a schematic diagram of the lower housing 101 viewed from above in a state in which the upper housing 102 is removed.

As shown in FIG. 5, for example, pixels corresponding to a center position P1 in the width direction A8 perpendicular to the medium conveying direction and positions P2 and P3 separated from the center position P1 by a predetermined distance outward within a imaging position L1 of the first imaging device 117a, are set as the first pixels. That is, each pixel in which each of position P1 to P3 is imaged in the first line image is set as the first pixel. The predetermined distance is set in advance to a length capable of calculating an inclination of a conveyed medium M. Pixels corresponding to each of peripheral region R1, R2, and R3 of each of position P1, P2, and P3, that is, pixels in which each of region R1 to R3 is imaged are set as the peripheral pixels of each first pixel. At least two pixels may be set as the first pixel. Pixel corresponding to any one of the positions P1, P2 or P3 may not be set as the first pixel.

For example, each pixel corresponding to each of end position P4 and P5 in the width direction A8 within an imaging position L2 of the second imaging device 117b, that is, each pixel in which each of position P4 and P5 is imaged, is set as the second pixel. Pixels corresponding to each of peripheral region R4 and R5 of each of the position P4 and P5, that is, pixels in which each of region R4 and R5 is imaged are set as the peripheral pixels of the second pixel.

At least one pixel may be set as the second pixel. A pixel corresponding to one of the positions P4 or P5 may not be set as the second pixel.

The storage device 160 includes a memory device such as a random access memory (RAM) or a read only memory (ROM), a fixed disk device such as a hard disk, or a portable storage device such as a flexible disk or an optical disk. Further, the storage device 160 stores a computer program, a database, a table, etc., used for various types of processing in the medium conveying apparatus 100. The computer program may be installed on the storage device 160 from a computer-readable, non-transitory medium such as a compact disc read only memory (CD-ROM), a digital versatile disc read only memory (DVD-ROM), etc., by using a well-known setup program, etc.

The processing circuit 170 operates in accordance with a program previously stored in the storage device 160. The processing circuit 170 is, for example, a CPU (Central Processing Unit). The processing circuit 170 may be a DSP, LSI, ASIC, FPGA, etc.

The processing circuit 170 is connected to the operating device 105, the display device 106, the first sensor 111, the second sensor 116, the imaging device 117, the motor 151, the interface device 152, the average value calculating circuit 153 and the storage device 160, etc., and controls each of these units. The processing circuit 170 performs drive control of the motor 151, imaging control of the imaging device 117, etc., generates an input image, and transmits the input image to the information processing apparatus via the interface device 152. Further, the processing circuit 170 determines whether or not a conveyance abnormality of the medium has occurred, based on the line image generated by the imaging device 117, and controls the conveyance of the medium based on the determination result.

Figure 6:
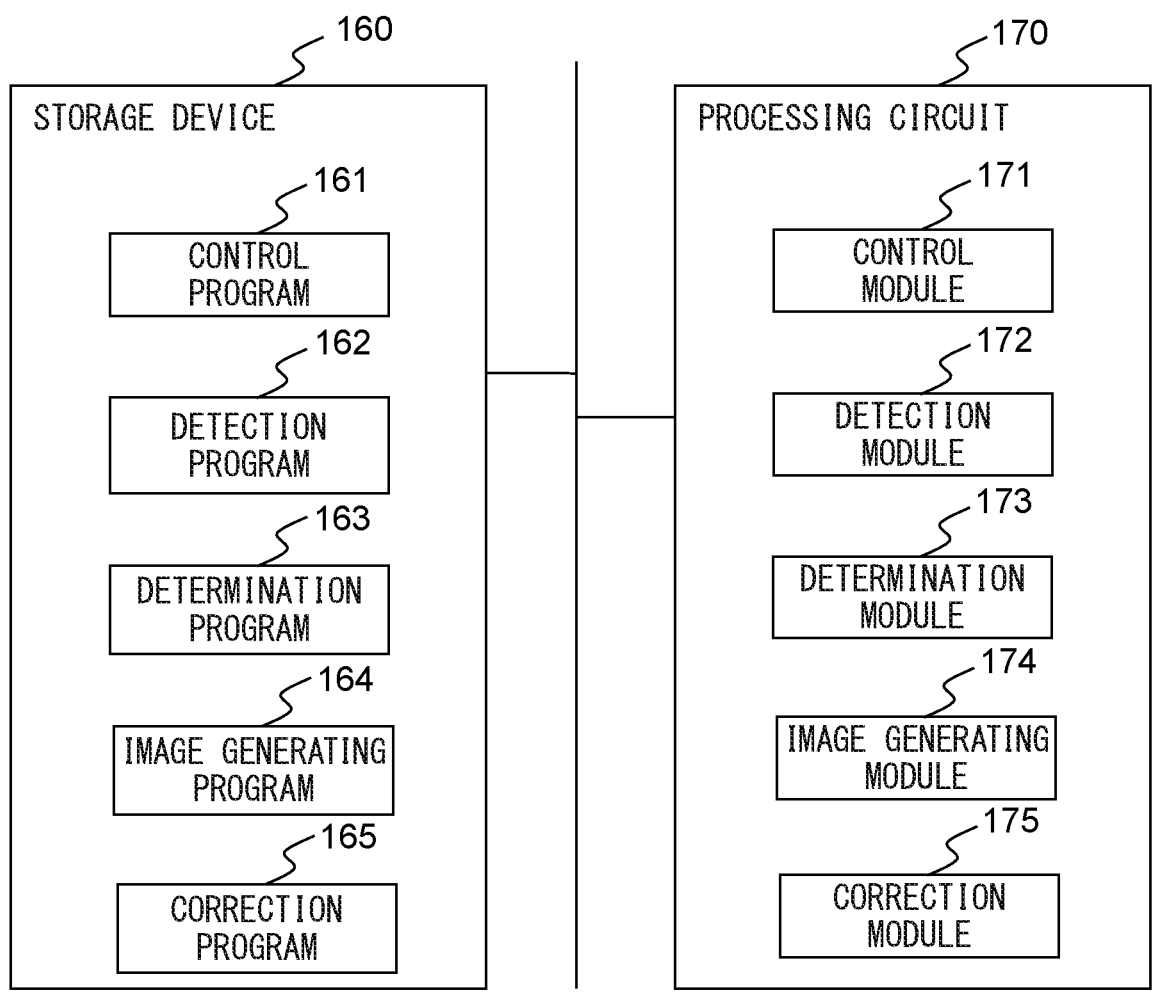
FIG. 6 is a diagram illustrating schematic configurations of the storage device 160 and the processing circuit 170.

FIG. 6 is a diagram illustrating schematic configurations of the storage device 160 and the processing circuit 170.

As shown in FIG. 6, a control program 161, a detection program 162, a determination program 163, an image generating program 164, and a correction program 165, etc., are stored in the storage device 160. Each of these programs is a functional module implemented by software operating on a processor. The processing circuit 170 reads each program stored in the storage device 160 and operates in accordance with each read program. Thus, the processing circuit 170 functions as a control module 171, a detection module 172, a determination module 173, an image generating module 174, and a correction module 175.

Figure 7:
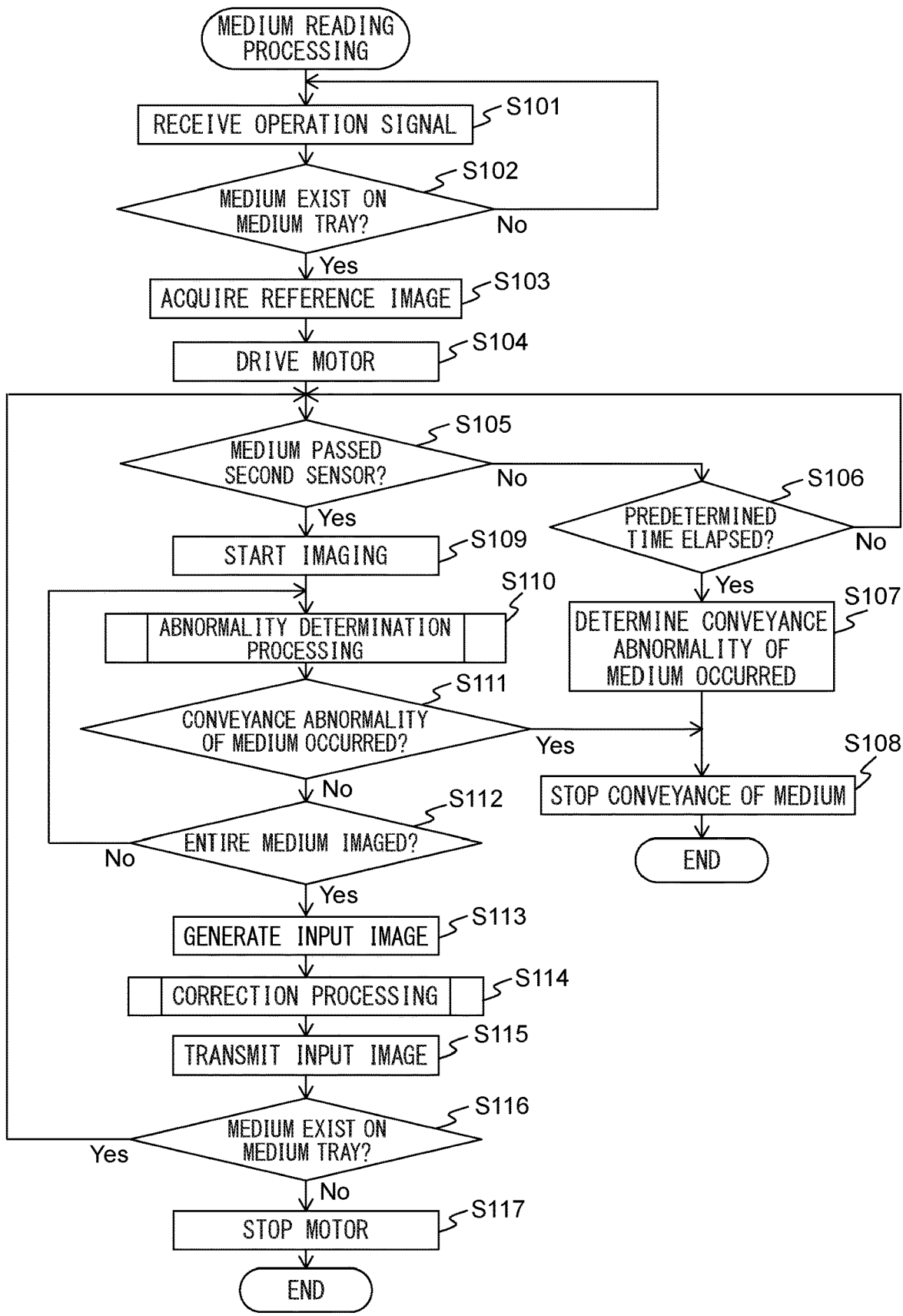
FIG. 7 is a flowchart illustrating an operation example of the medium reading processing.

FIG. 7 is a flowchart illustrating an operation example of medium reading processing in the medium conveying apparatus 100.

Referring to the flowchart illustrated in FIG. 7, an operation example of the medium reading processing in the medium conveying apparatus 100 will be described below. The operation flow described below is executed mainly by the processing circuit 170 in cooperation with each element in the medium conveying apparatus 100, in accordance with a program previously stored in the storage device 160. The operation flow illustrated in FIG. 7 is periodically executed.

First, the control module 171 stands by until an instruction to read a medium is input by a user by use of the operation device 105, and an operation signal instructing to read the medium is received from the operation device 105 (step S101).

Next, the control module 171 acquires the first medium signal from the first sensor 111 and determines whether or not the medium is placed on the medium tray 103 based on the acquired first medium signal (step S102).

When a medium is not placed on the medium tray 103, the control module 171 returns the processing to step S101 and stands by until newly receiving an operation signal from the operation device 105.

On the other hand, when a medium is placed on the medium tray 103, the control module 171 causes the imaging sensors 123 to generate the first reference image and the second reference image by imaging the facing surfaces of the backing member 124, and acquires the generated first reference image and the second reference image (step S103). Further, the control module 171 acquires the first average value and the second average value calculated from the first reference image and the second reference image from the first average value calculating circuit 153a and the second average value calculating circuit 153b.

Next, the control module 171 drives the motor 151, rotates the feed roller 112, the brake roller 113, and the first to fourth conveyance rollers 114, 115, 118, and 119, and feeds and conveys the medium (step S104).

Next, the control module 171 determines whether or not a front end of the medium has passed through a position of the second sensor 116 (step S105). The control module 171 periodically acquires the second medium signal from the second sensor 116 and determines whether or not the medium is present at the position of the second sensor 116 based on the acquired second medium signal. When a signal value of the second medium signal changes from a value indicating nonexistence of a medium to a value indicating existence of a medium, the control module 171 determines that the front end of the medium has passed through the position of the second sensor 116.

When the distal end of the medium has not passed through the position of the second sensor 116, the control module 171 determines whether or not a first predetermined time has elapsed after the feeding of the medium is started (step S106). The first predetermined time is set to the time acquired by adding a margin to the time required for the front end of the medium to pass through the position of the second sensor 116 after the feeding of the medium is started, by a prior experiment. When the first predetermined time has not elapsed after the feeding of the medium is started, the control module 171 returns the process to step S105, and repeats the process of step S105-S106.

On the other hand, when the first predetermined time has elapsed after the feeding of the medium is started, the determination module 173 determines that the conveyance abnormality such as a conveyance stop due to a jam (paper jam) or a slip of the medium has occurred (step S107).

Next, the control module 171 stops the motor 151, stops the feeding and conveying of the medium by the conveyance roller (step S108), and ends the series of steps. The control module 171 may notify the user that the conveyance abnormality of the medium has occurred, using a speaker (not shown), an LED, etc., after stopping the feeding and conveying of the medium.

On the other hand, in step S105, when the front end of the medium has passed through the position of the second sensor 116, the control module 171 causes the imaging device 117 to start imaging (step S109).

Next, the processing circuit 170 executes the abnormality determination processing (step S110). The processing circuit 170, executes the abnormality determination processing each time the imaging device 117 generates a first line image and the second line image. In the abnormality determination processing, the detection module 172 detects the inclination of the conveyed medium based on the first line image, and the determination module 173 determines whether or not a part of the conveyed medium has passed through a predetermined position based on the second line image. The control module 171 determines whether or not the conveyance abnormality such as skew of the medium has occurred based on the detection result by the detection module 172 and the determination result by the determination module 173. In other words, after the front end of the medium conveyed by the conveyance roller has passed through the position of the second sensor 116, the detecting module 172 detects the inclination of the conveyed medium, and the determination module 173 determines whether or not a part of the conveyed medium has passed through the predetermined position. Thus, the medium conveying apparatus 100 can reduce the processing load of the medium reading processing. Details of the abnormal determination processing will be described later.

Next, the control module 171 determines whether or not it is determined that the conveyance abnormality of the medium has occurred in the abnormality determination processing (step S111).

When it is determined that the conveyance abnormality of the medium has occurred in the abnormality determination processing, the control module 171 stops the motor 151, stops the feeding and conveying of the medium by the conveyance roller (step S108), and ends the series of steps.

On the other hand, when it is determined that the conveyance abnormality of the medium has not occurred in the abnormality determination processing, the control module 171 determines whether or not the entire conveyed medium has been imaged by the imaging device 117 (step S112). The control module 171 periodically acquires the second medium signal from the second sensor 116 and determines whether or not the medium is present at a position of the second sensor 116 based on the acquired second medium signal. The control module 171 determines that the rear end of the medium has passed through the position of the second sensor 116 when the signal value of the second medium signal changes from the value indicating existence of a medium to the value indicating nonexistence of a medium. The control module 171 determines that the entire medium has been imaged when the first predetermined time has elapsed after determining that the rear end of the medium has passed through the position of the second sensor 116. When the entire medium has not yet been imaged, the control module 171 returns the process to step S110 and repeats the process of step S110 to S112.

On the other hand, when the entire medium has been imaged, the image generating module 174 composites all the generated first line images to generate a first input image, and composites all the generated second line images to generate a second input image (step S113).

Next, the correction module 175 executes the correction processing (step S114). In the correction processing, the correction module 175 corrects the first input image and/or the second input image based on the average value of the gradation values of the peripheral pixels of each of the first pixels in the first line image and/or the average value of the gradation values of the peripheral pixels of the second pixel in the second line image. Details of the correction processing will be described later.

Next, the image generating module 174 transmits the first input image and the second input image to the information processing apparatus through the interface device 152 (step S115).

Next, the control module 171 determines whether or not the medium remains in the medium tray 103 based on the first medium signal acquired from the first sensor 111 (step S116). When a medium remains on the medium tray 103, the control module 171 returns the processing to step S105 and repeats the processing in steps S105 to S116.

On the other hand, when a medium does not remain on the medium tray 103, the control module 171 stops the motor 151 (step S117) and ends the series of steps.

Figure 8:
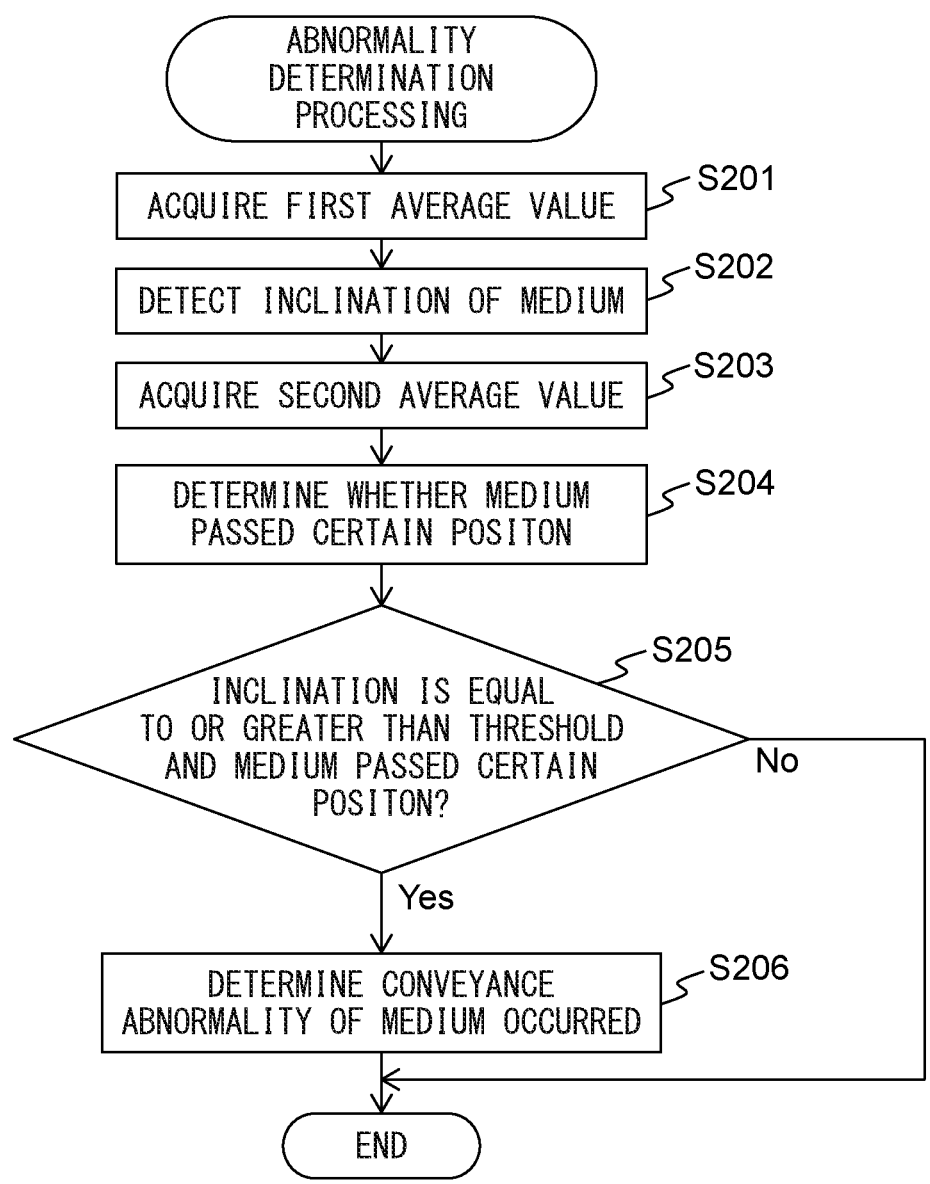
FIG. 8 is a flowchart illustrating an operation example of the abnormality determination processing.

FIG. 8 is a flowchart illustrating an example of the operation of the abnormality determination processing. The flow of operations shown in FIG. 8 is performed in step S110 of the flow chart shown in FIG. 7.

First, the detecting module 172 acquires respective first average values calculated from the latest first line image from the first average value calculating circuit 153a, and stores the first average values in the storage device 160 (step S201).

Next, the detection module 172 detects the inclination of the conveyed medium based on the respective first average values acquired so far (step S202).

First, the detection module 172 determines, for each of the plurality of first pixels, whether or not the front end of the medium has already been detected in each of the first pixel.

Next, the detection module 172 calculates a first variation value, for each of the first pixel in which the front end of the medium has not yet been detected. The detecting module 172 calculates a value acquired by subtracting the first average value calculated for the corresponding first pixel in the first reference image from the first average value calculated for each of the first pixel in the latest first line image, as the first variation value. The detection module 172 may calculate a value acquired by dividing the first average value calculated for each of the first pixel in the latest first line image by the first average value calculated for the corresponding first pixel in the first reference image, as the first variation value. Thus, the detecting module 172 can calculate the first variation value based on the difference between the gradation value of the backing member 124 and the gradation value of the medium.

Further, the detecting module 172 may calculate a value acquired by subtracting the first average value calculated for the corresponding first pixel in the immediately preceding first line image from the first average value calculated for each of the first pixel in the latest first line image, as the first variation value. Further, the detecting module 172 may calculate a value acquired by dividing the first average value calculated for each of first pixel in the latest first line image by the first average value calculated for the corresponding first pixel in the immediately preceding first line image, as the first variation value. Thus, the detecting module 172 can calculate the first variation value based on the difference between the gradation value of the shadow formed by the front end of the medium and the gradation value of the front end of the medium.

Next, the detection module 172 determines whether or not each of the first variation value calculated for each of the plurality of first pixels is greater than a first threshold value. For example, the first threshold value may be set to a difference in brightness value (for example, 20) according to which a person may determine a difference in brightness on an image by visual observation. When the first variation value is greater than the first threshold value, the detection module 172 determines that the front end of the medium is imaged in the first pixel corresponding to the first variation value, and detects the front end of the medium.

Next, the detecting module 172 determines whether or not the front end of the medium has already been detected for all of the first pixels. When the front end of the medium has been detected for all of the first pixels, the detecting module 172 calculates, for each pair of two first pixels adjacent to each other in the width direction A8 and detected as the front end of the medium, an inclination of a straight line passing through the two first pixels. For example, the detecting module 172 calculates a division value acquired by dividing the increase amount ΔY in the medium conveying direction A1 in the two first pixels by the increase amount ΔX in the width direction A8 in the two first pixels, as the inclination of the straight line passing through the two first pixels. The increase amount ΔY in the medium conveying direction A1 is a value acquired by subtracting, from the coordinate of the medium conveying direction A1 of one of the first pixels, the coordinate of the medium conveying direction A1 of the other first pixel, in the composite image acquired by compositing each first line image. The increase amount ΔX in the width direction A8 is a value acquired by subtracting, from the coordinate in the width direction A8 of one of the first pixels, the coordinate in the width direction A8 of the other first pixel, in the composite image acquired by compositing each first line image. The detecting module 172 detects an average value of the inclination of the straight line calculated for each pair, as the inclination of the conveyed medium.

FIG. 9A is a schematic diagram for illustrating the inclination of the medium.

FIG. 9A shows a composite image B in which a plurality of first line images are composite d. In FIG. 9A, the first line images are displayed reversed left and right. In the composite image B, a medium M conveyed inclined is imaged. In the example shown in FIG. 9A, a front end of the medium M is detected in a first pixel C1 of a first line image B1, the front end of the medium M is detected in a first pixel C2 of a first line image B2, the front end of the medium M is detected in a first pixel C3 of a first line image B3. A pair of the first pixels C1 and C2 and a pair of the first pixels C2 and C3 are extracted as a pair of two first pixels adjacent to each other in the width direction A8 and detected as the front end of the medium. Then, an average value of an inclination of a straight line D1 passing through the first pixels C1 and C2 (ΔY1/ΔX1) and an inclination of a straight line D2 passing through the first pixels C2 and C3 (ΔY2/ΔX2) is detected as the inclination of the conveyed medium.

Thus, the detecting module 172 detects the inclination of the conveyed medium based on the first average value of the gradation values of the peripheral pixels of each of the first pixels in the first line image. When only two pixels are set as the first pixels, the detecting module 172 detects a division value acquired by dividing the increase amount ΔY in the medium conveying direction A1 in the two first pixels by the increase amount ΔX in the width direction A8 in the two first pixels, as the inclination of the conveyed medium. The detecting module 172 may detect the inclination of the conveyed medium based on the gradation value of the first pixel in the first line image without using the first average value acquired from the first average value calculating circuit 153a. In this case, the detecting module 172 calculates a value acquired by subtracting the gradation value of the corresponding first pixel in the first reference image or the immediately preceding first line image from the gradation value of each of the first pixel in the latest first line image, as the first variation value. Alternatively, the detecting module 172 calculates a value acquired by dividing the gradation value of each of the first pixel in the latest first line image by the gradation value of the corresponding first pixel in the first reference image or the immediately preceding first line image, as the first variation value. Thus, the detecting module 172 detects the inclination of the conveyed medium based on at least two first pixels in the first line image.

Next, the determination module 173 acquires respective second average values calculated from the latest second line images from the second average value calculating circuit 153b and stores them in the storage device 160 (step S203).

Next, the determination module 173 determines whether or not a part of the conveyed medium has passed through a position corresponding to the second pixel, based on the acquired second average value (step S204).

First, the determination module 173 determines whether or not a part of the medium has already been detected in any of the second pixels. When a part of the medium has not been detected in any of the second pixels, the determination module 173 calculates the second variation value for each of the second pixels in the same manner as in the process of the step S202. The determination module 173 calculates a value acquired by subtracting the second average value calculated for the corresponding second pixel in the second reference image or the immediately preceding second line image from the second average value calculated for each of the second pixels in the latest second line image, as the second variation value. Alternatively, the determination module 173 calculates a value acquired by dividing the second average value calculated for each of the second pixels in the latest second line image by the second average value calculated for the corresponding second pixel in the second reference image or the immediately preceding second line image, as the second variation value.

Next, the determination module 173 determines whether or not any of the second variation value calculated for each of the second pixels is greater than a second threshold value. For example, the second threshold value may be set to a difference in brightness value (for example, 20) according to which a person may determine a difference in brightness on an image by visual observation. When any of the second variation value is greater than the second threshold value, the determination module 173 determines that a portion of the conveyed medium has passed through a position corresponding to the second pixel corresponding to the second variation value.

FIG. 9B is a schematic diagram for illustrating a passage of a position corresponding to the second pixel of the medium.

FIG. 9B shows a composite image E in which a plurality of second line images are composited. A medium M conveyed inclined is imaged in the composite image E. In the exemplary embodiment shown in FIG. 9B, in a second line image E1, it is determined that a part of the conveyed medium has passed through a position corresponding to a second pixel F1.

Thus, the determination module 173 determines whether or not a part of the conveyed medium has passed through the position corresponding to the second pixel based on the average value of the gradation values of the peripheral pixels of the second pixel in the second line image. The determination module 173 may determine whether or not a part of the conveyed medium has passed through the position corresponding to the second pixel, based on the gradation value of the second pixel in the second line image, without using the second average value acquired from the second average value calculating circuit 153b. In this case, the determination module 173 calculates a value acquired by subtracting the gradation value of the corresponding second pixel in the second reference image or the immediately preceding second line image from the gradation value of each of the second pixel in the second line image, as the second variation value. Alternatively, the detecting module 172 calculates a value acquired by dividing the gradation value of each of the second pixel in the latest second line image by the gradation value of the corresponding second pixel in the second reference image or the immediately preceding second line image, as the second variation value. Thus, the detecting module 172 determines whether or not a part of the conveyed medium has passed through the position corresponding to the second pixel, based on the second line image.

Next, the control module 171 determines whether or not the inline detected by the detection module 172 is equal to or greater than the threshold value, and determines whether or not the determination module 173 determines a part of the medium has passed through the position corresponding to the second pixel (step S205). When the inclination detected by the detection module 172 is less than the threshold value, or when the determination module 173 does not determine that a part of the medium has passed through the position corresponding to the second pixel, the control module 171 determines that the conveyance abnormality of the medium has not yet occurred, and ends the series of steps.

On the other hand, when the inclination detected by the detecting module 172 is equal to or greater than the threshold value and the determination module 173 determines that a part of the medium has passed through the position corresponding to the second pixel, the control module 171 determines that the conveyance abnormality of the medium has occurred (step S206), and ends the series of steps. In this case, in the step S108 of FIG. 7, the control module 171 stops conveyance of the medium by the conveyance roller.

The medium conveying apparatus 100 may determine whether or not the conveyance abnormality of the medium has occurred based on only either one of the first line image or the second line image. In this case, for example, the second average value calculating circuit 153b is omitted, and the first average value calculating circuit 153a calculates the first average value of the gradation values of the peripheral pixels of each of the first pixels in the first line image, and calculates the second average value of the gradation values of the peripheral pixels of the second pixel in the first line image. In step S203, the determination module 173 acquires the second average value from the first average value calculating circuit 153a. Alternatively, the first average value calculating circuit 153a is omitted, and the second average value calculating circuit 153b calculates the second average value of the gradation values of the peripheral pixels of the second pixel in the second line image, and calculates the first average value of the gradation values of the peripheral pixels of each of the first pixels in the second line image. In this case, in step S201, the detecting module 172 acquires the first average value from the second average value calculating circuit 153b. In these cases, the correction process is omitted. The medium conveying apparatus 100 can reduce the circuit scale, thereby can reduce the cost and power consumption of the device.

Further, the detection module 172 detects the inclination of the medium based on the second line image, the determination module 173 may determine whether or not a part of the medium has passed through the position corresponding to the second pixel based on the first line image. In this case, for example, the first average value calculating circuit 153a calculates the second average value of the gradation values of the peripheral pixels of the second pixel in the first line image, and the second average value calculating circuit 153b calculates the first average value of the gradation values of the peripheral pixels of each of the first pixels in the second line image. In step S201, the detecting module 172 acquires the first average value from the second average value calculating circuit 153b, and in step S203, the determination module 173 acquires the second average value from the first average value calculating circuit 153a.

Further, the average value calculating circuit 153 is omitted, and the processing circuit 170 may calculate the first average value and/or the second average value from the first line image and the second line image. In this case, although the processing load of the medium reading processing increases, the medium conveying apparatus 100 can reduce the circuit scale, thereby can reduce the cost and power consumption of the device.

Further, the detecting module 172 may detect the inclination of the conveyed medium based on both the first line image and the second line image. In this case, the second average value calculating circuit 153b calculates the second average value of the gradation values of the peripheral pixels of the second pixel in the second line image, and calculates the first average value of the gradation values of the peripheral pixels of each of the first pixels in the second line image. In step S201, the detecting module 172 acquires each first average value calculated from the latest first line image from the first average value calculating circuit 153a, and acquires each first average value calculated from the latest second line image from the second average value calculating circuit 153b. In step S202, the detecting module 172 detects an average value, a minimum value or a maximum value of the inclination calculated based on each first average value calculated from the first line image and the inclination calculated based on each first average value calculated from the second line image, as the inclination of the conveyed medium. Thus, the detection module 172 can more accurately detect the inclination of the conveyed medium.

Further, the determination module 173 may determine whether or not a part of the conveyed medium has passed through the position corresponding to the second pixel based on both the first line image and the second line image. In this case, the first average value calculating circuit 153a calculates the first average value of the gradation values of the peripheral pixels of each of the first pixels in the first line image, and calculates the second average value of the gradation values of the peripheral pixels of the second pixel in the first line image. In step S203, the determination module 173 acquires each second average value calculated from the latest second line image from the second average value calculating circuit 153b, and acquires each second average value calculated from the latest first line image from the first average value calculating circuit 153a. In step S204, the determination module 173 determines that a part of the conveyed medium has passed through the position corresponding to the second pixel when the second variation value calculated from the second line image is larger than the second threshold value and the second variation value calculated from the first line image is larger than the second threshold value. The determination module 173 may determine that a part of the conveyed medium has passed through the position corresponding to the second pixel when the second variation value calculated from the second line image is larger than the second threshold value, or when the second variation value calculated from the first line image is larger than the second threshold value. Thus, the determination module 173 can more accurately determine whether or not a part of the conveyed medium has passed through the position corresponding to the second pixel.

Figure 10:
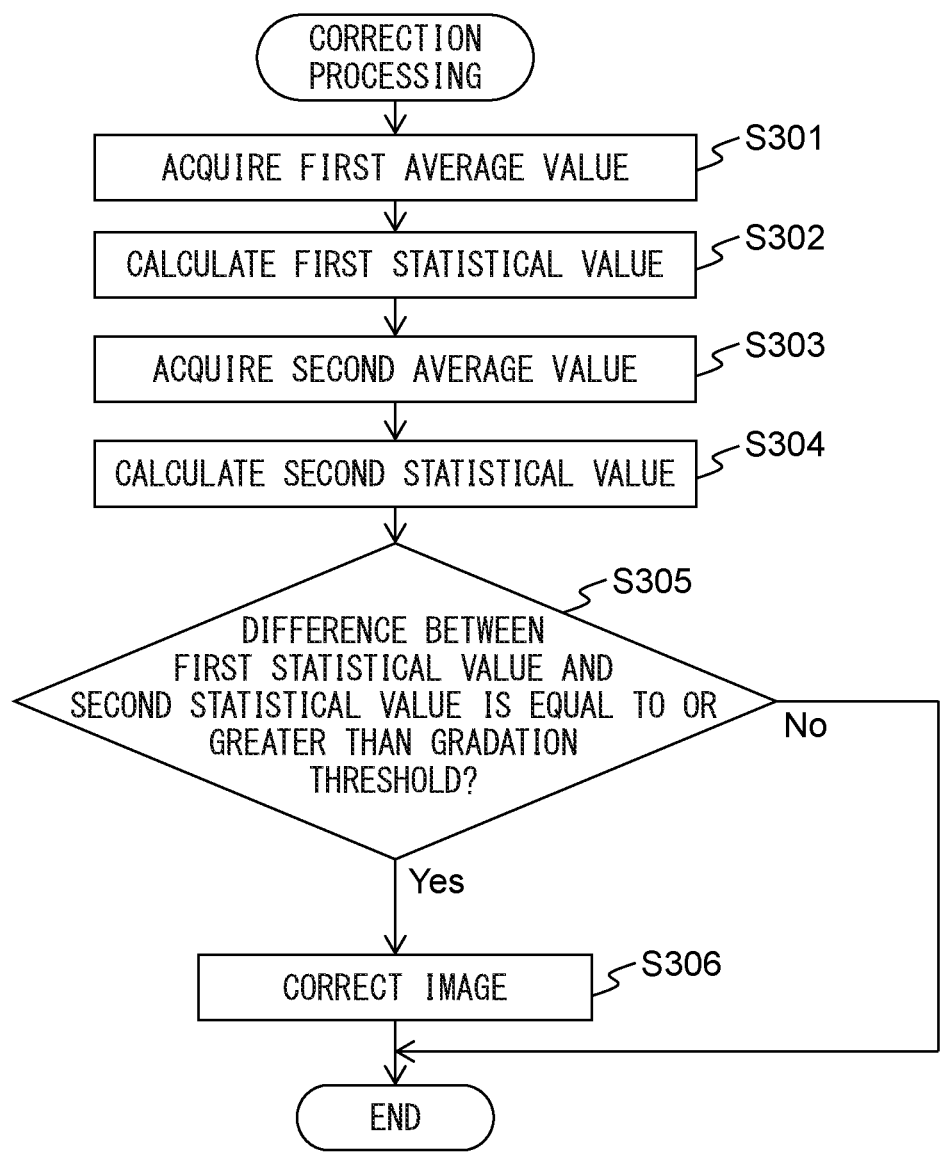
FIG. 10 is a flowchart illustrating an operation example of the correction processing.

FIG. 10 is a flowchart illustrating an example of an operation of the correction processing. The flow of operations shown in FIG. 10 is performed in step S114 of the flowchart shown in FIG. 7.

First, the correction module 175 reads out and acquires the first average values calculated from all the first line images from the storage device 160 (step S301).

Next, the correction module 175 calculates a first statistical value of the acquired first average values (step S302). The correction module 175 calculates an average value, a median value, a mode value, a maximum value or a minimum value of the first average values, as the first statistical value. The correction module 175 may calculate the first statistical value from only the first average value at the end portion (the front end and the rear end) in the medium conveying direction A1 among the first average values. Thus, the correction module 175 can calculate the first statistical value so as not to be affected by the content (characters, ruled lines, images, etc.) printed on the medium.

Next, the correction module 175 reads out and acquires the second average values calculated from all the second line images from the storage device 160 (step S303).

Next, the correction module 175 calculates a second statistical value of the acquired second average value (step S304). The correction module 175 calculates an average value, a median value, a mode value, a maximum value or a minimum value of the second average values, as the second statistical value. The correction module 175 may calculate the second statistical value from only the second average value at the end portion (the front end and the rear end) in the medium conveying direction A1 among the second average values. Thus, the correction module 175 can calculate the second statistical value so as not to be affected by the content printed on the medium.

Next, the correction module 175 determines whether or not the difference between the calculated first statistical value and the second statistical value is equal to or greater than a gradation threshold value (step S305). The gradation threshold value can be set, for example, to a difference (e.g., 20) of gradation values that a person can visually distinguish a difference in brightness on an image. When the difference between the first statistical value and the second statistical value is less than the gradation threshold value, the correction module 175 ends the series of steps without executing the processing in particular.

On the other hand, when the difference between the first statistical value and the second statistical value is equal to or greater than the gradation threshold value, the correction module 175 corrects the first input image and/or the second input image (step S306), and ends the series of steps. For example, the correction module 175 corrects the first input image so as to add a subtraction value acquired by subtracting the first statistical value from the second statistical value, to the gradation value of each pixel in the first input image when the first statistical value is smaller than the second statistical value. The correction module 175 may correct the second input image so as to subtract a subtraction value acquired by subtracting the first statistical value from the second statistical value, from the gradation value of each pixel in the second input image when the first statistical value is smaller than the second statistical value. On the other hand, the correction module 175 corrects the second input image so as to add a subtraction value acquired by subtracting the second statistical value from the first statistical value, to the gradation value of each pixel in the second input image when the second statistical value is smaller than the first statistical value. The correction module 175 may correct the first input image so as to subtract a subtraction value acquired by subtracting the second statistical value from the first statistical value, from the gradation value of each pixel in the first input image when the second statistical value is smaller than the first statistical value.

Thus, the correction module 175 corrects the first input image or the second input image based on the first average value and the second average value. The first input image is an example of an image based on the first line image, and the second input image is an example of an image based on the second line image. As a result, when the distances from each of the first light source 122a and the second light source 122b to the medium are greatly different, and the overall brightness of the first input image and the overall brightness of the second input image is different, the correction module 175 can unify the overall brightness of each input image. Further, by correcting the input image using the first average value and the second average value used for conveyance control of the medium, the correction module 175 can efficiently correct each input image while suppressing an increase in the processing load.

As described in detail above, the medium conveying apparatus 100 stops conveyance of the medium when the inclination of the medium detected based on the first line image is equal to or greater than the threshold value and it is determined that a part of the medium has passed through the position corresponding to the second pixel based on the second line image. Thus, even when the skew of the medium occurs, the medium conveying apparatus 100 stops the conveyance of the medium when the possibility of the medium colliding with the side wall of the conveyance path is high, while continuing the conveyance of the medium when the possibility of the medium colliding with the side wall of the conveyance path is low, thereby suppressing the occurrence of damage to the medium. In other words, even when a part of the medium passes through a position such as an end portion of the imaging device 117, the medium conveying apparatus 100 stops the conveyance of the medium when the skew of the medium occurs, while continuing the conveyance of the medium when the skew of the medium does not occur, thereby suppressing the occurrence of damage to the medium. Therefore, the medium conveying apparatus 100 can more appropriately control the conveyance of the medium.

Further, the medium conveying apparatus 100 determines that the conveyance abnormality of the medium has occurred only when a part of the medium actually passes through a position such as an end portion of the imaging device 117, and stops conveyance of the medium. Thus, the medium conveying apparatus 100 can more accurately determine whether or not the conveyance abnormality of the medium has occurred.

Further, when the possibility that a part of the content in the medium is not imaged by the imaging device 117 is high, the medium conveying apparatus 100 can stop the conveyance of the medium and notify the user that the conveyance abnormality of the medium has occurred, thereby improving the convenience of the user.

Further, since the medium conveying apparatus 100 determines the occurrence of the conveyance abnormality of the medium based on the image captured by the imaging device 117, the medium conveying apparatus 100 can determine whether or not the conveyance abnormality of the medium occurs, without using a special sensor for detecting that the medium is close to the side wall of the conveyance path.

Accordingly, the medium conveying apparatus 100 can determine whether or not the conveyance abnormality of the medium has occurred while suppressing an increase in the device cost and the device size.

When the number of pixels for calculating the average value of the gradation values of the peripheral pixels is increased in each of the average value calculating circuits 153, the circuit scale of each average value calculating circuit 153 increases, and the device cost of the medium conveying apparatus 100 increases. In the medium conveying apparatus 100, the number of pixels for calculating the average value of the gradation values of the peripheral pixels from the first line image and the number of pixels for calculating the average value of the gradation values of the peripheral pixels from the second line image are set to 2 to 3, respectively. Thus, the medium conveying apparatus 100 can further correct both the first input image and the second input image with a low load and with high accuracy using the first average value and the second average value while suppressing an increase in the device cost.

In particular, the medium conveying apparatus 100 may properly stop the conveyance of the medium when a medium larger than the maximum size of the medium supported by the medium conveying apparatus 100, a stapled medium, a medium folded into 2, etc., is conveyed and the skew of the medium occurs.

Figure 11:
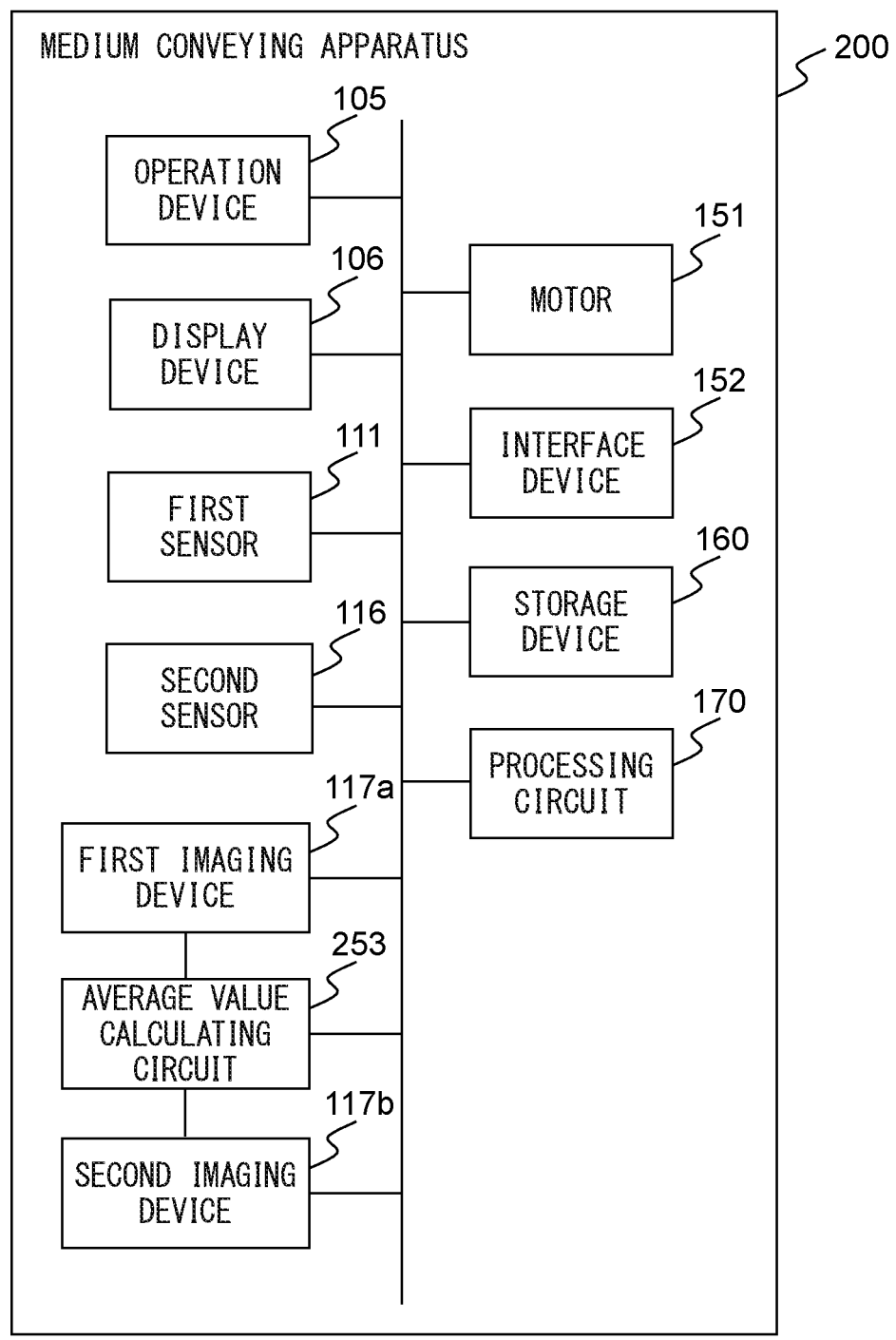
FIG. 11 is a block diagram illustrating a schematic configuration of another medium conveying apparatus 200.

FIG. 11 is a block diagram illustrating a schematic configuration of a medium conveying apparatus 200 according to another embodiment.

As shown in FIG. 11, the medium conveying apparatus 200 includes an average value calculating circuit 253 instead of the first average value calculating circuit 153a and the second average value calculating circuit 153b.

The average value calculating circuit 253 can receive the first line image from the first imaging device 117a, calculate the first average value of the gradation values of the peripheral pixels of each of the first pixels in the received first line image, and output the first average value to the processing circuit 170. Furthermore, the average value calculating circuit 253 can receive the second line image from the second imaging device 117b, calculates the second average value of the gradation values of the peripheral pixels of the second pixel in the received second line image, and output the second average value to the processing circuit 170. However, the average value calculating circuit 253 calculates and outputs only one of the first average value or the second average value, according to the setting from the processing circuit 170.

Figure 12:
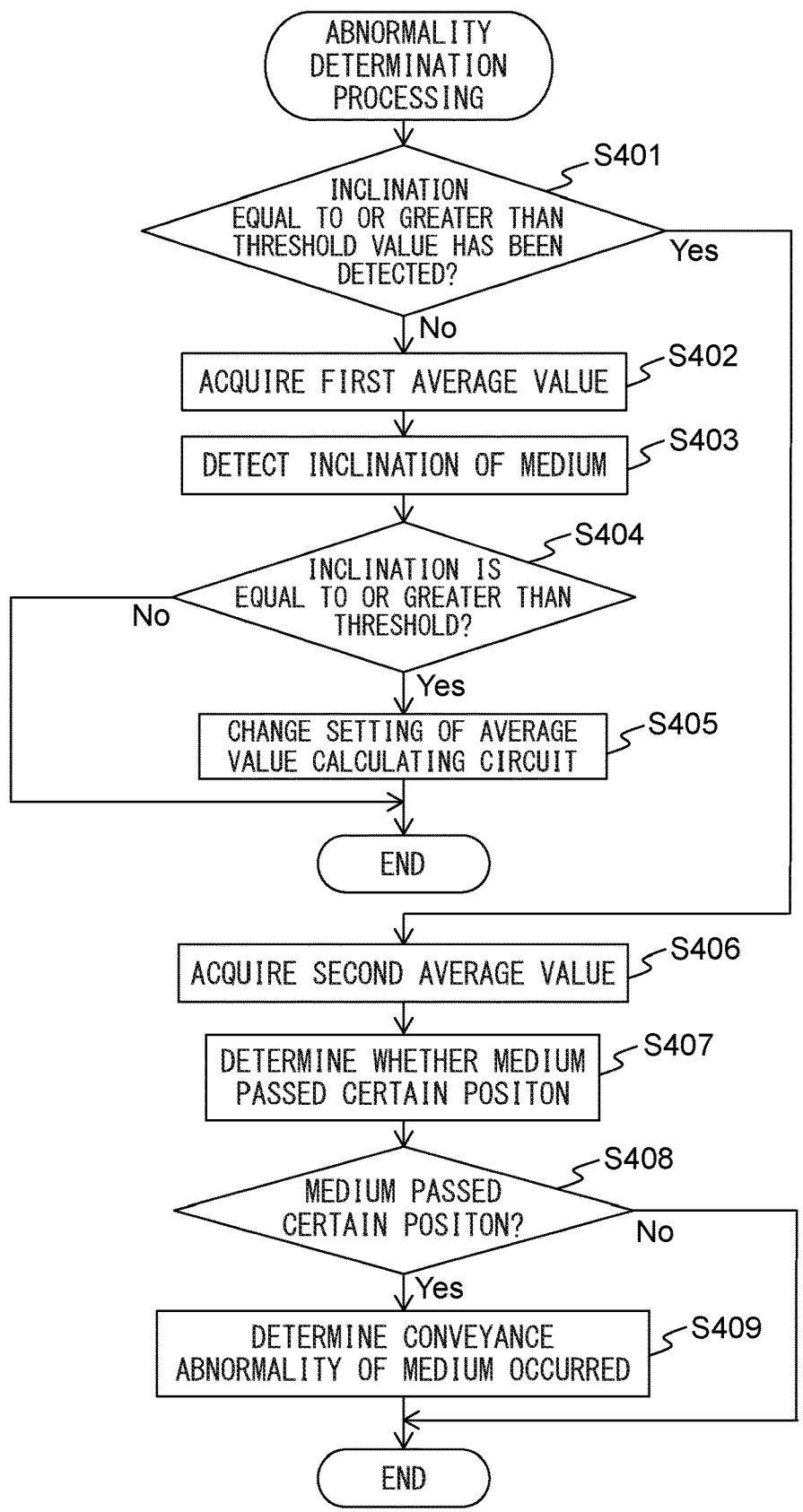
FIG. 12 is a flowchart illustrating an operation example of another abnormality determination processing.

FIG. 12 is a flowchart illustrating an example of an operation of an abnormality determination processing by the medium conveying apparatus 200. The flowchart shown in FIG. 12 is performed instead of the flowchart shown in FIG. 8. The average value calculating circuit 253 is set to calculate and output the first average value at the start of conveyance of the medium by the control module 171.

First, the detecting module 172 determines whether or not an inclination equal to or greater than a threshold value has been detected as the inclination of the medium for the currently conveyed medium (step S401). When the inclination equal to or greater than the threshold has already been detected, the detection module 172 proceeds the process to step S406.

On the other hand, when an inclination equal to or greater than the threshold value has not yet been detected, the detecting module 172 acquires the first average value calculated from the latest first line image from the average value calculating circuit 253 and stores the first average value in the storage device 160 (step S402).

Next, the detecting module 172 detects the inclination of the conveyed medium in the same manner as the process of step S202 of FIG. 8 (step S403).

Next, the control module 171 determines whether or not the inclination detected by the detecting module 172 is equal to or greater than the threshold value (step S404). When the inclination detected by the detecting module 172 is less than the threshold value, the control module 171 determines that the conveyance abnormality of the medium has not yet occurred, and ends the series of steps.

On the other hand, when the inclination detected by the detection module 172 is equal to or greater than the threshold value, the control module 171, changes the setting of the average value calculating circuit 253 so that, thereafter, the average value calculating circuit 253 calculates and outputs the second average value (step S405), and ends the series of steps.

On the other hand, when an inclination equal to or greater than the threshold value has already been detected in the step S401, the determination module 173 acquires the second average value calculated from the latest second line image from the average value calculating circuit 253 and stores the second average value in the storage device 160 (step S406).

Next, the determination module 173 determines whether or not a part of the conveyed medium has passed through the position corresponding to the second pixel, in the same manner as in the process of step S204 of FIG. 8 (step S407).

Next, the control module 171 determines whether or not the determination module 173 determines that a part of the medium has passed through the position corresponding to the second pixel (step S408). When the determination module 173 does not determine that a part of the medium has passed through the position corresponding to the second pixel, the control module 171 determines that the conveyance abnormality of the medium has not yet occurred, and ends the series of steps.

On the other hand, when the determination module 173 determines that a part of the medium has passed through the position corresponding to the second pixel, the control module 171 determines that the conveyance abnormality of the medium has occurred (step S409), and ends the series of steps. In this case, in the step S108 of FIG. 7, the control module 171 stops conveyance the medium by the conveyance roller.

Thus, only when the inclination detected by the detection module 172 is equal to or greater than the threshold value, the determination module 173 determines whether or not a part of the conveyed medium has passed through the position corresponding to the second pixel based on the second line image generated thereafter. Thus, the average value calculating circuit 253 does not need to calculate the first average value and the second average value at the same time, thereby can reduce the number of pixel groups for calculating the average value at the same time. Therefore, the medium conveying apparatus 100 can reduce the circuit scale, thereby can reduce the cost and power consumption of the device.

Similar to the medium conveyance apparatus 100, the medium conveyance apparatus 200 may include a first average value calculating circuit 153a and a second average value calculating circuit 153b to execute the abnormality determination processing shown in FIG. 12. In this case, in step S402, the detecting module 172 acquires the first average values from the first average value calculating circuit 153a, and in step S406, the determination module 173 acquires the second average values from the second average value calculating circuit 153b.

Similar to the medium conveying apparatus 100, the medium conveying apparatus 200 may determine whether or not the conveyance abnormality of the medium has occurred based on only either one of the first line image or the second line image. In this case, for example, the average value calculating circuit 253 calculates the first average value of the gradation values of the peripheral pixels of each of the first pixels in the first line image and calculates the second average value of the gradation values of the peripheral pixels of the second pixel in the first line image. Alternatively, the average value calculating circuit 253 calculates the first average value of the gradation values of the peripheral pixels of each of the first pixels in the second line image and calculates the second average value of the gradation values of the peripheral pixels of the second pixel in the second line image. In these cases, the correction processing is omitted. The medium conveying apparatus 200 can simplify the circuit configuration of the average value calculating circuit 253 and can reduce the cost and power consumption of the device.

Similar to the medium conveying apparatus 100, the detecting module 172 may detect the inclination of the medium based on the second line image, and the determination module 173 may determine whether or not a part of the medium has passed through the position corresponding to the second pixel based on the first line image. In this case, for example, the average value calculating circuit 253 calculates the second average value of the gradation values of the peripheral pixels of the second pixel in the first line image and calculates the first average value of the gradation values of the peripheral pixels of each of the first pixels in the second line image. Similar to the medium conveying apparatus 100, the average value calculating circuit 253 may be omitted, and the processing circuit 170 may calculate the first average value and the second average value from the first line image and the second line image.

As described in detail above, even when the average value calculating circuit 253 is used in place of the first average value calculating circuit 153a and the second average value calculating circuit 153b, the medium conveyance apparatus 200 can more appropriately control the conveyance of the medium.

Figure 13:
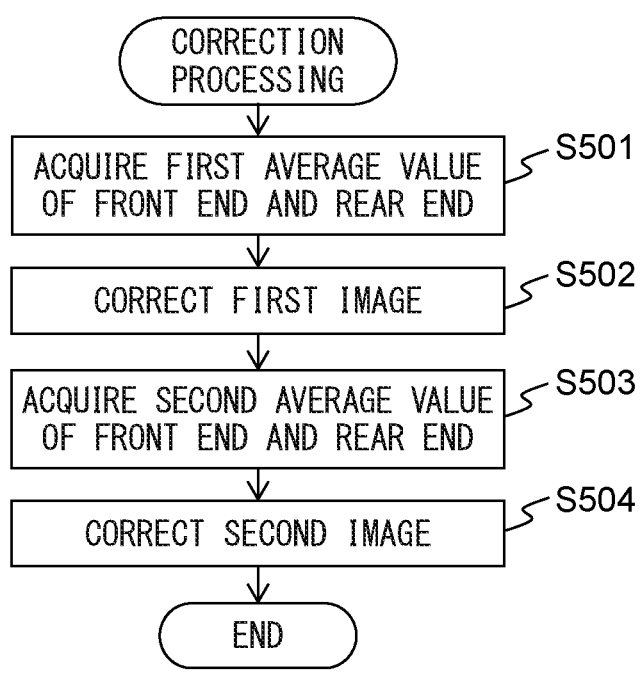
FIG. 13 is a flowchart illustrating an operation example of another correction processing.

FIG. 13 is a flowchart illustrating an operation example of correction processing according to another embodiment. The flowchart shown in FIG. 13 is performed instead of the flowchart shown in FIG. 10.

First, the correction module 175 reads out and acquires the first average value calculated from the first line image in which the front end of the medium is imaged and the first average value calculated from the first line image in which the rear end of the medium is imaged from the storage device 160 (step S501). The correction module 175 specifies the first line image in which the front end of the medium is detected by the detection module 172 in step S202 of FIG. 8, as the first line image in which the front end of the medium is imaged. Further, when the first variation value becomes larger than the first threshold value after the rear end of the medium passes through the position of the second sensor 116, the correction module 175 detects a first pixel adjacent to the medium in the conveying direction side with respect to the first pixel corresponding to the first variation value, as the rear end of the medium. Then, the correction module 175 specifies the first line image in which the rear end of the medium is detected, as the first line image in which the rear end of the medium is imaged.

Next, the correction module 175 corrects the first input image based on the first average value calculated from the first line image in which the front end of the medium is imaged and the first average value calculated from the first line image in which the rear end of the medium is imaged (step S502).

For example, when the front end or the rear end of the medium is lifted and conveyed with respect to the conveyance path, a distance between each position of the medium and the first light source 122*a* changes in the medium conveying direction A1, and there is a possibility that the brightness of the medium changes in the vertical direction (medium conveying direction A1) in the first input image. The correction module 175 corrects the first input image so that the brightness of the medium in the vertical direction is constant in the first input image, based on the first average value of the front end of the medium and the first average value of the rear end of the medium. When the first average value of the rear end of the medium is higher than the first average value of the front end of the medium, the correction module 175 corrects each pixel in the first input image so that the gradation value of the pixel is lower, as the pixel is closer to the rear end side of the medium. On the other hand, when the first average value of the rear end of the medium is lower than the first average value of the front end of the medium, the correction module 175 corrects each pixel in the first input image so that the gradation value of the pixel is higher, as the pixel is closer to the rear end side of the medium.

For example, the correction module 175 calculates a correction coefficient α by the following equation (1), and corrects each pixel in the first input image by multiplying the gradation value of each pixel by the correction coefficient α.

$$\alpha = y_0/y' \qquad (1)$$

Wherein, y' is a linear interpolated value based on the first average value $y_0$ of the front end of the medium and the first average value $y_1$ of the rear end of the medium at a position of a pixel to be corrected in the vertical direction of the first input image, and is calculated by the following equation (2).

$$y' = y_0 + (y_1 - y_0) \times (x - x_0)/(x_1 - x_0) \qquad (2)$$

Wherein, $x_0$ is a vertical position (coordinate) of the front end of the medium in the first input image, $x_1$ is a vertical position of the rear end of the medium in the first input image, and x is a vertical position of a pixel to be corrected in the input image.

The correction module 175 may calculate the correction coefficient α according to the following equation (3) based on the first average value $y_1$ of the rear end of the medium, not the first average value $y_0$ of the front end of the medium.

$$\alpha = y_1/y \qquad (3)$$

Next, the correction module 175 reads out and acquires the second average value calculated from the second line image in which the front end of the medium is imaged and the second average value calculated from the second line image in which the rear end of the medium is imaged, from the storage device 160 (step S503). The correction module 175 acquires the second averaged values, in the same manner as the process of step S501.

Next, the correction module 175 corrects the second input image based on the second average value calculated from the second line image in which the front end of the medium is imaged and the second average value calculated from the second line image in which the rear end of the medium is imaged (step S504), and ends the series of steps. The correction module 175 corrects the second input image in the same manner as the process of step S502.

The correction module 175 may omit either one of steps S501 to S502 or steps S503 to S504 and correct only either one of the first input image or the second input image. Further, the correction module 175 may execute both the correction processing shown in FIG. 13 and the correction processing shown in FIG. 10.

Thus, the correction module 175 corrects the first input image based on the first average value and/or corrects the second input image based on the second average value. Incidentally, the correction module 175 may correct the first line image or the second line image, rather than correcting the first input image or the second input image, based on the first average value and the second average value. In this case, the image generating module 174 composites the corrected first line images to generate the first input image, and composites the corrected second line images to generate the second input image.

As described in detail above, the medium conveying apparatus can more appropriately control the conveyance of the medium even when the first input image is corrected based on the first average value and the second input image is corrected based on the second average value.

Figure 14:
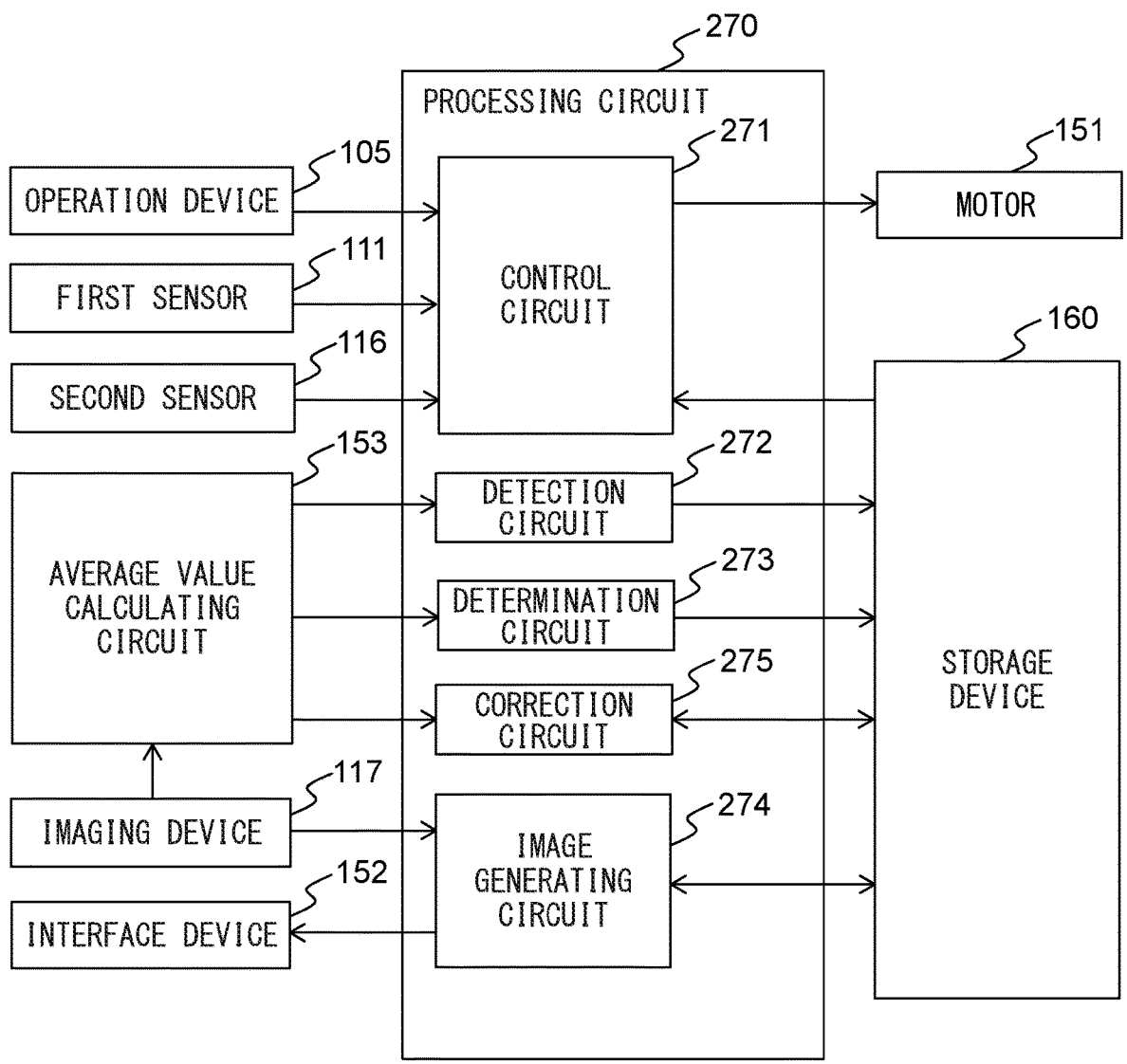
FIG. 14 is a diagram illustrating a schematic configuration of another processing circuit 270.

FIG. 14 is a diagram illustrating a schematic configuration of a processing circuit 270 in a medium conveying apparatus according to another embodiment. The processing circuit 270 is used in place of the processing circuit 170 in the medium conveying apparatus 100 or the medium conveying apparatus 200 and executes the medium reading processing, etc., in place of the processing circuit 170. The processing circuit 270 includes a control circuit 271, a detection circuit 272, a determination circuit 273, an image generating circuit 274 and a correction circuit 275, etc. Note that each unit may be configured by an independent integrated circuit, a microprocessor, firmware, etc.

The control circuit 271 is an example of a control module and has a function similar to the control module 171. The control circuit 271 receives an operation signal from the operating device 105, a first medium signal from the first sensor 111, and a second medium signal from the second sensor 116, and reads out the detection result of the inclination of the medium and the determination result of the passage of a predetermined position of the medium from the storage device 160. The control circuit 271 drives the motor 151 according to the received signals and the read detection result and determination result, and when the conveyance abnormality of the medium is detected, stops the motor 151.

The detection circuit 272 is an example of a detection module, and has a functions similar to the detection module 172. The detection circuit 272 receives the average values from the average value calculating circuit 153 (or 253), detects the inclination of the medium based on the received average values, and stores the detection result in the storage device 160.

The determination circuit 273 is an example of a determination module has a functions similar to the determination module 173. The determination circuit 273 receives the average values from the average value calculating circuit 153 (or 253), determines whether or not a part of the medium has passed through the position corresponding to the second pixel based on the received average value, and stores the determination result in the storage device 160.

The image generating circuit 274 is an example of an image generating module and has a functions similar to the image generating module 174. The image generating circuit 274 receives the first line images and the second line images from the imaging device 117, generates a first input image and the second input image from the received line images, and stores in the storage device 160. Further, the image generating circuit 274 reads out the first input image and the second input image corrected by the correction circuit 275 from the storage device 160 and transmits the first input image and the second input image to the information processing apparatus through the interface device 152.

The correction circuit 275 is an example of a correction module and has a functions similar to the correction module 175. The correction circuit 275 receives the average values from the average value calculating circuit 153 (or 253) and reads out the first input image and the second input image from the storage device 160. The correction circuit 275 corrects the first input image and the second input image based on the average values and stores them in the storage device 160.

As described in detail above, the medium conveying apparatus can more appropriately control the conveyance of the medium even when the processing circuit 270 is used.

According to embodiments, the media conveying device, the method, and the computer-readable non-temporary medium storing the control program, can more appropriately control the conveyance of the media.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A medium conveying apparatus comprising:
a conveyance roller to convey a medium;
an imaging sensor to sequentially generate a line image acquired by imaging the medium conveyed by the conveyance roller;
a processor to
detect an inclination of the conveyed medium based on at least two first pixels in the line image,
determine whether a part of the conveyed medium has passed through a position corresponding to a second pixel located outside the first pixels in a direction perpendicular to the medium conveyance direction based on the line image, and
stop conveyance of the medium by the conveyance roller when the detected inclination is equal to or greater than a threshold value and the processor determines that a part of the medium has passed through the position corresponding to the second pixel.

2. The medium conveying apparatus according to claim 1, wherein
the imaging sensor includes a first imaging sensor to generate a first line image acquired by imaging one surface of the medium conveyed by the conveyance roller, and a second imaging sensor to generate a second line image acquired by imaging the other surface of the medium conveyed by the conveyance roller, and wherein
the processor
detects the inclination of the conveyed medium based on the first line image, and
determines whether a part of the conveyed medium has passed through the position corresponding to the second pixel based on the second line image.

3. The medium conveying apparatus according to claim 2, further comprising:
a first average value calculating circuit to calculate an average value of gradation values of peripheral pixels of each of the first pixels in the first line image; and
a second average value calculating circuit to calculate an average value of gradation values of peripheral pixels of the second pixel in the second line image, wherein
the processor
detects the inclination of the conveyed medium based on the average value of the gradation values of the peripheral pixels of each of the first pixels in the first line image, and
determines whether a part of the conveyed medium has passed through the position corresponding to the second pixel based on the average value of the gradation values of the peripheral pixels of the second pixel in the second line image.

4. The medium conveying apparatus according to claim 3, wherein the processor corrects the first line image, the second line image, an image based on the first line image, or an image based on the second line image based on the average value of the gradation values of the peripheral pixels of each of the first pixels in the first line image and the average value of the gradation values of the peripheral pixels of the second pixel in the second line image.

5. The medium conveying apparatus according to claim 2, wherein
the second imaging sensor is located on a downstream side of the first imaging sensor in a medium conveying direction, and wherein
the processor detects the inclination of the conveyed medium based on the first line image and the second line image.

6. The medium conveying apparatus according to claim 2, wherein
the second imaging sensor is located on a downstream side of the first imaging sensor in a medium conveying direction, and wherein
the processor determines whether a part of the conveyed medium has passed through the position corresponding to the second pixel based on the first line image and the second line image.

7. The medium conveying apparatus according to claim 1, wherein the processor determines whether a part of the conveyed medium has passed through the position corresponding to the second pixel only when the detected inclination is equal to or greater than the threshold value, based on the line image generated thereafter.

8. The medium conveying apparatus according to claim 1, further comprising a medium sensor located between the conveyance roller and the imaging device in a medium conveying direction, wherein
the processor detects the inclination of the conveyed medium after a front end of the medium conveyed by the conveyance roller has passed through a position of the medium sensor.

9. A method for controlling conveying of a medium, comprising:
conveying a medium by a conveyance roller;
sequentially generating a line image acquired by imaging the medium conveyed by the conveyance roller, by an imaging sensor;
detecting an inclination of the conveyed medium based on at least two first pixels in the line image;
determining whether a part of the conveyed medium has passed through a position corresponding to a second pixel located outside the first pixels in a direction perpendicular to the medium conveyance direction based on the line image; and
stopping conveyance of the medium by the conveyance roller when the detected inclination is equal to or greater than a threshold value and it is determined that a part of the medium has passed through the position corresponding to the second pixel.

10. The method according to claim 9, wherein
the imaging sensor includes a first imaging sensor to generate a first line image acquired by imaging one surface of the medium conveyed by the conveyance roller, and a second imaging sensor to generate a second line image acquired by imaging the other surface of the medium conveyed by the conveyance roller, wherein
the inclination of the conveyed medium is detected based on the first line image, and wherein
whether a part of the conveyed medium has passed through the position corresponding to the second pixel is determined based on the second line image.

11. The method according to claim 10, further comprising:
calculating an average value of gradation values of peripheral pixels of each of the first pixels in the first line image by a first average value calculating circuit; and
calculating an average value of gradation values of peripheral pixels of the second pixel in the second line image by a second average value calculating circuit, wherein
the inclination of the conveyed medium is detected based on the average value of the gradation values of the peripheral pixels of each of the first pixels in the first line image, and wherein
whether a part of the conveyed medium has passed through the position corresponding to the second pixel is determined based on the average value of the gradation values of the peripheral pixels of the second pixel in the second line image.

12. The method according to claim 11, further comprising correcting the first line image, the second line image, an image based on the first line image, or an image based on the second line image based on the average value of the gradation values of the peripheral pixels of each of the first pixels in the first line image and the average value of the gradation values of the peripheral pixels of the second pixel in the second line image.

13. The method according to claim 10, wherein
the second imaging sensor is located on a downstream side of the first imaging sensor in a medium conveying direction, and wherein
the inclination of the conveyed medium is detected based on the first line image and the second line image.

14. The method according to claim 10, wherein
the second imaging sensor is located on a downstream side of the first imaging sensor in a medium conveying direction, and wherein
whether a part of the conveyed medium has passed through the position corresponding to the second pixel is determined based on the first line image and the second line image.

15. A medium conveying apparatus comprising:
a conveyance roller to convey a medium;
a first imaging sensor to sequentially generate a first line image acquired by imaging one surface of the medium conveyed by the conveyance roller;
a second imaging sensor to sequentially generate a second line image acquired by imaging the other surface of the medium conveyed by the conveyance roller;
a processor to
detect an inclination of the conveyed medium based on at least two first pixels in the first line image,
determine whether a part of the conveyed medium has passed through a position corresponding to a second pixel located outside the first pixels based on the second line image, and
stop conveyance of the medium by the conveyance roller when the detected inclination is equal to or greater than a threshold value and the processor determines that a part of the medium has passed through the position corresponding to the second pixel.

16. A method for controlling conveying of a medium, comprising:
conveying a medium by a conveyance roller;
sequentially generating a first line image acquired by imaging the medium conveyed by the conveyance roller, by a first imaging sensor;
sequentially generating a second line image acquired by imaging the other surface of the medium conveyed by the conveyance roller, by a second imaging sensor;
detecting an inclination of the conveyed medium based on at least two first pixels in the first line image;
determining whether a part of the conveyed medium has passed through a position corresponding to a second pixel located outside the first pixels based on the second line image; and
stopping conveyance of the medium by the conveyance roller when the detected inclination is equal to or greater than a threshold value and it is determined that a part of the medium has passed through the position corresponding to the second pixel.

* * * * *